(12) United States Patent
Sano et al.

(10) Patent No.: US 8,412,900 B1
(45) Date of Patent: Apr. 2, 2013

(54) STORAGE SYSTEM AND VOLUME PAIR SYNCHRONIZATION METHOD

(75) Inventors: Kazuhide Sano, Fujinomiya (JP);
Katsuhiro Okumoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 31 days.

(21) Appl. No.: 13/263,457

(22) PCT Filed: Sep. 27, 2011

(86) PCT No.: PCT/JP2011/005410
§ 371 (c)(1),
(2), (4) Date: Oct. 7, 2011

(51) Int. Cl.
*G06F 12/16* (2006.01)
*G06F 13/00* (2006.01)
*G06F 13/42* (2006.01)

(52) U.S. Cl. .......... 711/162; 711/154; 711/170; 710/29; 710/31; 710/38

(58) Field of Classification Search .................. 711/154, 711/162, 170; 710/29, 31, 38
See application file for complete search history.

(56) References Cited

U.S. PATENT DOCUMENTS

| | | | |
|---|---|---|---|
| 5,623,611 A * | 4/1997 | Matsukawa et al. | 710/52 |
| 5,872,944 A * | 2/1999 | Goldrian et al. | 710/305 |
| 6,334,161 B1 * | 12/2001 | Suzuki et al. | 710/29 |
| 6,446,175 B1 | 9/2002 | West et al. | |
| 8,203,976 B2 * | 6/2012 | Komoda | 370/276 |
| 8,321,600 B2 * | 11/2012 | Solomon et al. | 710/8 |
| 2007/0050547 A1 | 3/2007 | Sano et al. | |
| 2007/0180211 A1 | 8/2007 | Takaoka et al. | |
| 2010/0299447 A1 | 11/2010 | Salvi et al. | |

FOREIGN PATENT DOCUMENTS

| | | |
|---|---|---|
| EP | 1562118 A2 | 8/2005 |
| EP | 1912116 A2 | 4/2008 |
| JP | 2002290489 A | 10/2002 |
| JP | 2004272406 A | 9/2004 |
| JP | 2007058611 A | 3/2007 |

* cited by examiner

*Primary Examiner* — John Lane
(74) *Attorney, Agent, or Firm* — Volpe And Koenig, P.C.

(57) ABSTRACT

To inhibit the occurrence of communication failures in the system in which a secondary storage control apparatus acquires journal data from a primary storage control apparatus and writes the data to a secondary volume. The primary storage control apparatus comprises a command processing unit, a journal data creation unit, a journal data transfer unit which reads journal data to the secondary storage control apparatus, and a transfer control unit. In specified occasions, the transfer control unit controls at least either one of the journal data transfer amount by the journal data transfer unit and the width of the communication band utilized for journal data transfer.

8 Claims, 27 Drawing Sheets

Fig. 8

Pair management table T10

| PVOL# C100 | Attribute C101 | JG# C102 | Pair status C103 | Processing status C104 | SVOL# C105 | JG# C106 |
|---|---|---|---|---|---|---|
| 0 | Primary | 1 | PAIR | N/A | 1000 | 2 |
| 1 | Primary | 1 | Suspend | N/A | 1001 | 2 |
| 2 | Unused (0) | — | Simplex | N/A | 1002 | — |
| 3 | Primary | 1 | Copy | Copying | 1003 | 2 |
| 4 | Primary | 1 | Copy | Creating pair | 1004 | 2 |

Fig. 9

Pair management table T20

| C200 SVOL# | C201 Attribute | C202 JG# | C203 Pair status | C204 Processing status | C205 PVOL# | C206 JG# |
|---|---|---|---|---|---|---|
| 1000 | Secondary | 2 | PAIR | N/A | 0 | 1 |
| 1001 | Secondary | 2 | Suspend | N/A | 1 | 1 |
| 1002 | Unused (0) | — | Simplex | — | 2 | — |
| 1003 | Secondary | 2 | Copy | N/A | 3 | 1 |
| 1004 | Secondary | 2 | Copy | N/A | 4 | 1 |

Fig. 10

| Journal group management table T11 | | | | |
|---|---|---|---|---|
| Word | Byte0 | Byte1 | Byte2 | Byte3 |
| 0 | Valid/invalid bitmap (journal volume) | | | |
| 1 | | | | |
| 2 | JG status | Type | Abnormality code | |
| 3 | Journal volume # | | | |
| ... | ... | | | |
| 66 | Journal volume # | | | |
| 67 | JG registration time | | | |
| 68 | JG ending time | | | |
| 69 | Number of data volumes | | | |
| 70 | Fullness monitoring time | | | |
| 71 | Cache overload monitoring time | | | |
| 72 | TS | Spare | Spare | Spare |
| 73 | Journal sequence # | | | |
| 74 | Copiable sequence # | | | |
| 75 | Copied sequence # | | | |
| 76 | Purged sequence # | | | |
| 77 | Read sequence # | | | |
| 78 | Restored sequence # | | | |
| 79 | Number of journal data | | | |
| 80 | Valid/invalid bitmap (data volume) | | | |
| ... | ... | | | |
| 2127 | Valid/invalid bitmap (data volume) | | | |
| 4175 | Journal volume usage rate (MCU) | | | |
| 4176 | Journal volume usage rate (RCU) | | | |
| 4177 | Average RD JNL command response time | | | |
| 4178 | Possibility of switching | Number of paths | Flag being used | Spare |

Fig. 12

Switched path number ascertaining table — T13

| C130<br>Journal volume usage rate (MCU) | C131<br>Journal input/output ratio JA<br>(=Creation speed/reading speed) | C132<br>Number of paths<br>(MCU→RCU) | C133<br>Number of paths to be switched |
|---|---|---|---|
| Overload (70% and higher) | JA≧2 | 4 | 4 |
| Medium load (10% to 69%) | 0.5<JA<2 | 4 | 2 |
| Low load (lower than 10%) | JA≦0.5 | 4 | 0 |

Fig. 13

Transfer amount ascertaining table — T14

| Journal volume usage rate (MCU) — C140 | Journal volume usage rate (RCU) — C141 | Ratio — C142 |
|---|---|---|
| Overload (70% and higher) | Overload | 30% |
| | Medium load | 50% |
| | Low load | 70% |
| Medium load (10% to 69%) | Overload | 30% |
| | Medium load | 50% |
| | Low load | 50% |
| Low load (lower than 10%) | Overload | 30% |
| | Medium load | 70% |
| | Low load | 70% |

Fig. 15

| Byte | \multicolumn{8}{c|}{RD JNL command parameter} |
| --- | --- | --- | --- | --- | --- | --- | --- | --- |
| | Bit0 | Bit1 | Bit2 | Bit3 | Bit4 | Bit5 | Bit6 | Bit7 |
| 0 | Command code | | | | | | | |
| 1 | Spare | | | | | | | |
| 2 | Mode | | | | | | | |
| 3 | Extent number | | | | | | | |
| 4-9 | Journal group number (MCU) | | | | | | | |
| 10 | Sequence number | | | | | | | |
| 11 | Command number (0-FF) | | | | | | | |
| 12-13 | Model code / Mirror number | | | | | | | |
| 14 | Journal data transfer speed TS | | | | | | | |
| 15 | Journal volume usage rate JU (RCU) | | | | | | | |
| | Average RD JNL command response time RT | | | | | | | |

Fig. 16

| Byte | RD JNL command response parameter | | | | | | | |
|------|------|------|------|------|------|------|------|------|
|      | Bit0 | Bit1 | Bit2 | Bit3 | Bit4 | Bit5 | Bit6 | Bit7 |
| 0    | Processing code | | | | | | | |
| 1    | Read start sequence number | | | | | | | |
| 2    | Read start sequence number | | | | | | | |
| 3    | Spare | | | | | | | |
| 4-9  | Switched port number | | | | | | | |
| 10   | MCU apparatus serial number | | | | | | | |
| 11   | MCU apparatus serial number | | | | | | | |
| 12-13| MCU apparatus serial number | | | | | | | |
| 14   | SSID | | | | | | | |
| 15   | LRC | | | | | | | |

STORAGE SYSTEM AND VOLUME PAIR SYNCHRONIZATION METHOD

TECHNICAL FIELD

The present invention relates to a storage system and a volume pair synchronization method.

BACKGROUND ART

From the perspective of disaster recovery, a storage system in which data is managed in a plurality of sites by using journal data is proposed. The contents of a primary volume which a primary site comprises are copied to a secondary volume in a secondary site at a physically distant location by using journal data (Patent Literature 1). By this method, the processing required for business can be continued even if a failure occurs in either the primary site or the secondary site.

It should be noted that, although this is not directly related to the storage system, in case a data transfer amount increases, a technology of using a spare line in addition to a regularly used line (Patent Literature 2) and a technology of automatically adjusting a transfer speed based on whether transfer between the computer and external apparatuses succeeded or not (Patent Literature 3) are known.

CITATION LIST

Patent Literature

[Patent Literature 1] Japanese Patent Application Laid-Open (Kokai) No. 2007-058611
[Patent Literature 2] Japanese Patent Application Laid-Open (Kokai) No. 2002-290489
[Patent Literature 3] Japanese Patent Application Laid-Open (Kokai) No. 2004-272406

SUMMARY OF INVENTION

Technical Problem

For building a system by a conventional technology, a data transfer amount from the primary site to the secondary site is estimated, and a communication band according to the data transfer amount is secured. However, the initially secured communication band might become insufficient because the types of business processing operating in the host computer and the configuration of the storage system change respectively.

For example, there might be a case where a compression rate at an extender connecting the primary site and the secondary site is deteriorated, a case where the number of host computers using storage control apparatuses increases, a case where the data amount created in business processing in the host computer increases, and a case where a data I/O (Input/Output) pattern changes. If any of the cases occurs, the data transfer amount per unit of time decreases. This leads to an occurrence of a timeout error at the time of data transfer or an overload status due to excessive journal data accumulating in journal volumes. The frequent occurrence of timeout errors causes a line failure, which leads to performance deterioration of the storage system.

The present invention is created in view of the above-mentioned problems and the purpose thereof is to provide a storage system and a volume pair synchronization method capable of appropriately adjusting the transfer amount of journal data which is transferred from the primary storage control apparatus to the secondary storage control apparatus. Another purpose of the present invention is to provide a storage system capable of controlling the journal data transfer amount based on the respective usage rates of the primary and secondary journal volumes and furthermore capable of using at least a part of first communication paths for transmitting commands from the primary storage control apparatus to the secondary storage control apparatus as second communication paths for transmitting commands from the secondary storage control apparatus to the primary storage control apparatus.

Solution to Problem

For solving the above-mentioned problems, the storage system complying with the present invention is a storage system in which a primary storage control apparatus and a secondary storage control apparatus are connected by way of a communication network, and the primary storage control apparatus and the secondary storage control apparatus are connected by way of at least one first communication path for transmitting commands from the primary storage control apparatus to the secondary storage control apparatus and at least one second communication path for transmitting commands from the secondary storage control apparatus to the primary storage control apparatus, wherein the primary storage control apparatus comprises a command processing unit for writing write data received from the host computer to a primary volume, a journal data creation unit for creating journal data based on the write data and storing the journal data in a primary journal volume corresponding to the primary volume, a journal data transfer unit for reading journal data from the primary journal volume based on a journal data read request received by way of the second communication path and transferring the read journal data to the secondary storage control apparatus, and a transfer control unit which, in specified occasions, controls at least either one of the journal data transfer amount by the journal data transfer unit and the width of the communication band utilized for journal data transfer, while the secondary storage control apparatus comprises a journal data acquisition unit which issues the journal data read request, acquires the journal data from the journal data transfer unit, and stores the acquired journal data in the secondary journal volume and a journal processing unit which reads the journal data from the secondary journal volume and writes the data to the secondary volume corresponding to the primary volume.

A transfer status determination unit for determining whether journal data transfer by the journal data transfer unit succeeded or not
is installed and, if it is determined by the transfer status determination unit that the journal data transfer failed, the transfer control unit can also control at least either one of the transfer amount of journal data by the journal data transfer unit and the width of the communication band.

If the journal data transfer speed decreases to equal to or lower than the specified speed or if performance improvement is requested, the transfer control unit can control at least either one of the journal data transfer amount by the journal data transfer unit and the width of the communication band.

The transfer control unit can ascertain the journal data transfer amount by the journal data transfer unit based on the usage rates of the primary journal volume and the secondary journal volume.

If it is determined that journal data transfer failed, the transfer control unit performs communication path switching processing for switching the direction of communication paths and, in the communication path switching processing, can extend the communication band where journal data can be transferred by setting the communication direction of the specified first communication paths among first communication paths in the opposite direction and using the specified first communication paths as second communication paths.

If it is determined that journal data transfer failed, the transfer control unit firstly performs the communication path switching processing and, if it is determined that journal data transfer failed even after performing the communication path switching processing, can perform transfer amount adjustment processing.

The above-mentioned characteristics of the present invention can be combined in various other ways than explicitly shown. Furthermore, the present invention can also be comprehended as a computer program. The computer program is installed in the computer by way of communication media or recording media.

BRIEF DESCRIPTION OF DRAWINGS

FIG. 8 shows a table for managing pairs of primary volumes and secondary volumes managed in the main site.

FIG. 9 shows a table for managing pairs of primary volumes and secondary volumes managed in the remote site.

FIG. 10 shows a table for managing a journal group.

FIG. 12 shows a table used in case of ascertaining the number of paths whose communication direction is to be switched.

FIG. 13 shows a table used in case of adjusting the journal data transfer amount.

FIG. 15 shows the configuration of a journal data read request.

FIG. 16 shows the configuration of a response to the journal data read request.

DESCRIPTION OF EMBODIMENTS

Figure 1:
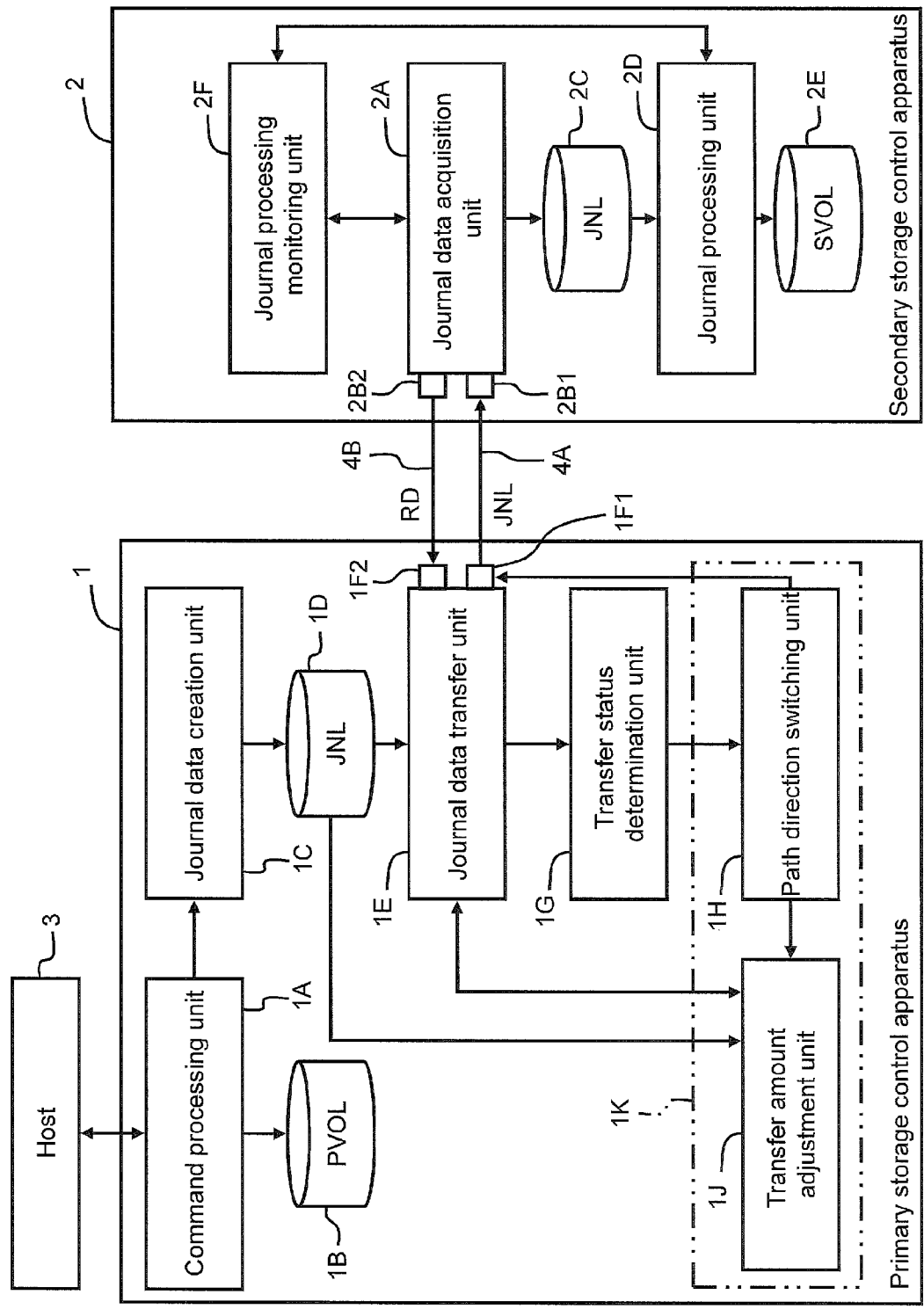
FIG. 1 shows the general overview of the embodiments of the present invention.

Hereinafter, in accordance with the attached figures, the embodiments of the present invention are explained. FIG. 1 shows the overview of the present embodiment. A storage system comprises a primary storage control apparatus 1 and a secondary storage control apparatus 2. A computer system including the storage system comprises a host computer 3 which uses the primary storage control apparatus 1. Furthermore, a plurality of Extenders 40 (refer to FIG. 2) can also be installed in the storage system.

The host computer (hereinafter referred to as the host) 3 performs various application programs such as a customer management program, a merchandise management program, an image delivery program, and a content creation program by utilizing the data in the primary storage control apparatus 1.

The primary storage control apparatus 1 is installed in the primary site. The primary storage control apparatus 1 comprises, for example, a command processing unit 1A, a primary volume 1B, a journal data creation unit 1C, a journal volume 1D, a journal data transfer unit 1E, communication ports 1F1, 1F2, a transfer status determination unit 1G, a path direction switching unit 1H, and a transfer amount adjustment unit 1J. A transfer control unit 1K is configured of the path direction switching unit 1H and the transfer amount adjustment unit 1J.

The command processing unit 1A processes commands issued from the host 3. The primary volume 1B stores the data which the host 3 uses. The journal data creation unit 1C creates journal data in accordance with write data. The journal data is stored in the journal volume 1D.

The journal data transfer unit 1E receives a journal data read request transmitted from a journal data acquisition unit 2A of the secondary storage control apparatus 2 by way of a second communication path 4B and the communication port 1F2.

The journal data transfer unit 1E reads a specified amount of journal data from the journal volume 1D in accordance with the journal data read request. The journal data transfer unit 1E transmits the journal data to the journal data acquisition unit 2A.

The primary storage control apparatus 1 comprises the two types of communication ports 1F1 and 1F2. One communication port 1F1 is an initiator port which comprises an initiator attribute. The initiator port 1F1 is connected to a communication port 2B1 of the secondary storage control apparatus 2 by way of a first communication path 4A.

The communication port 2B1 is a target port which comprises a target attribute.

The other communication port 1F2 is a target port which comprises a target attribute.

The target port 1F2 is connected to a communication port 2B2 which the secondary storage control apparatus 2 comprises by way of the second communication path 4B. The communication port 2B2 is an initiator port which comprises an initiator attribute.

The transfer status determination unit 1G determines the journal data transfer status from the journal data transfer unit 1E to the journal data acquisition unit 2A. For example, if an timeout error and others occur and journal data transfer is not performed normally, the path direction switching processing 1H and the transfer amount adjustment processing 1J by the transfer control unit 1K are performed.

The path direction switching unit 1H switches the direction of communication paths. The path direction switching unit 1H reverses the direction of the first communication path 4A and uses the path as a second communication path. If the specified conditions are satisfied, the path direction switching unit 1H returns the first communication path 4A whose direction of communication is reversed to the original direction of communication.

Reversing the communication direction of a communication path indicates changing the attributes of the respective communication ports connected to the communication path and reversing the direction in which commands flow. The first communication path 4A usually transmits commands from the primary storage control apparatus 1 to the secondary storage control apparatus 2. Therefore, reversing the communication direction of the first communication path 4A indicates the capability to transmit commands from the secondary storage control apparatus 2 to the primary storage control apparatus 1 by way of the first communication path 4A. Therefore, [the path direction switching unit 1H] changes the attribute of the communication port 1F1 of the primary storage control apparatus 1 connected to the first communication path 4A from an initiator to a target, and furthermore changes the attribute of the communication port 2B1 of the secondary storage control apparatus 2 connected to the first communication path 4A from a target to an initiator.

By using the first communication path 4A as a second communication path 4B, the total communication band of the second communication path 4B can be extended. As a result of this, the amount of journal data which the secondary storage control apparatus 2 can read from the primary storage control apparatus 1 can be increased. In other cases, if the journal data amount is not to be changed, the occurrence of timeout errors can be inhibited in advance.

The transfer amount adjustment unit 1J adjusts the journal data transfer amount. For example, if a timeout error occurs, the transfer amount adjustment unit 1J decreases the journal data transfer amount (which may also be referred to as a transfer speed). The transfer amount adjustment unit 1J adjusts the journal data transfer amount per communication path.

The transfer control unit 1K can perform either one of or both the path direction switching unit 1H and the transfer amount adjustment unit 1J. In an embodiment explained later, the transfer control unit 1K firstly performs the path direction switching unit 1H to extend the communication band and, if a timeout error still occurs, performs the transfer amount adjustment unit 1J to decrease the journal data transfer amount. Specifically speaking, the transfer amount adjustment unit 1J decreases the journal data transfer speed.

In another embodiment explained later, [the transfer control unit 1K] firstly performs the transfer amount adjustment unit 1J to decrease the journal data transfer amount and, if a timeout error still occurs, performs the path direction switching unit 1H to extend the communication band.

The configuration of the secondary storage control apparatus 2 is explained below. The secondary storage control apparatus 2 is created in a remote site distant from the primary site. The secondary storage control apparatus 2 comprises, for example, a journal data acquisition unit 2A, communication ports 2B1, 2B2, a journal volume 2C, a journal processing unit 2D, a secondary volume 2E, and a journal processing monitoring unit 2F.

The journal data acquisition unit 2A regularly or irregularly acquires journal data cumulated in the journal volume 1D of the primary storage control apparatus 1. The journal data acquisition unit 2A transmits a journal data read request to the primary storage control apparatus 1 by way of the second communication path 4B. The journal data acquisition unit 2A receives journal data by way of the second communication path 4B, and stores the journal data in the journal volume 2C.

The secondary storage control apparatus 2 comprises the communication port 2B1 connected to the first communication path 4A and the communication port 2B2 connected to the second communication path 4B. One communication port 2B1 is a target port which comprises a target attribute. The other communication port 2B2 is an initiator port which comprises an initiator attribute.

The journal processing unit 2D writes the journal data stored in the journal volume 2C to a specified location in the secondary volume 2E in order of issuance. Writing journal data to the secondary volume 2E and updating the stored contents are also referred to as reflecting journal data in the secondary volume 2E.

Journal data is created when write data is written to the primary volume 1B in order of the writing. Therefore, journal data must be written to the secondary volume 2E in the correct order. If all the journal data in the secondary journal volume 2C is written to the secondary volume 2E, the stored contents of the secondary volume 2E and the stored contents of the primary volume 1B become consistent. The stored contents of the respective volumes 1B and 2E becoming consistent are also referred to as synchronizing the respective volumes 1B and 2E.

The journal processing monitoring unit 2F monitors the journal processing and notifies the result of monitoring to the primary storage control apparatus 1. The journal processing monitoring unit 2F monitors, for example, the time required for acquiring journal data (response time to a journal data read request) and the usage rate of the journal volume 2C. The result of monitoring is included as a parameter in the journal data read request issued from the journal data acquisition unit 2A.

As explained above, in the present embodiment, the journal data in the primary journal volume 1D is transferred to the secondary storage control apparatus 2 in accordance with the journal data read request issued from the secondary storage control apparatus 2. The secondary storage control apparatus 2 leads journal data transfer.

Meanwhile, the primary storage control apparatus 1 can change the setting related to journal data transfer in specified occasions. As the specified occasions, for example, a case where a timeout error and others occur regarding journal data transfer, a case where the journal data transfer speed is decreased to a specified speed or lower, and a case where performance improvement is requested by the user such as the system administrator can be named.

The primary storage control apparatus 1 inhibits the occurrence of line failures by reversing the direction of the communication paths (1H) or adjusting the journal data transfer amount. By this method, the present embodiment can maintain the reliability of the storage system and prevent performance deterioration. The present embodiment is explained in detail below.

Embodiment 1

Figure 2:
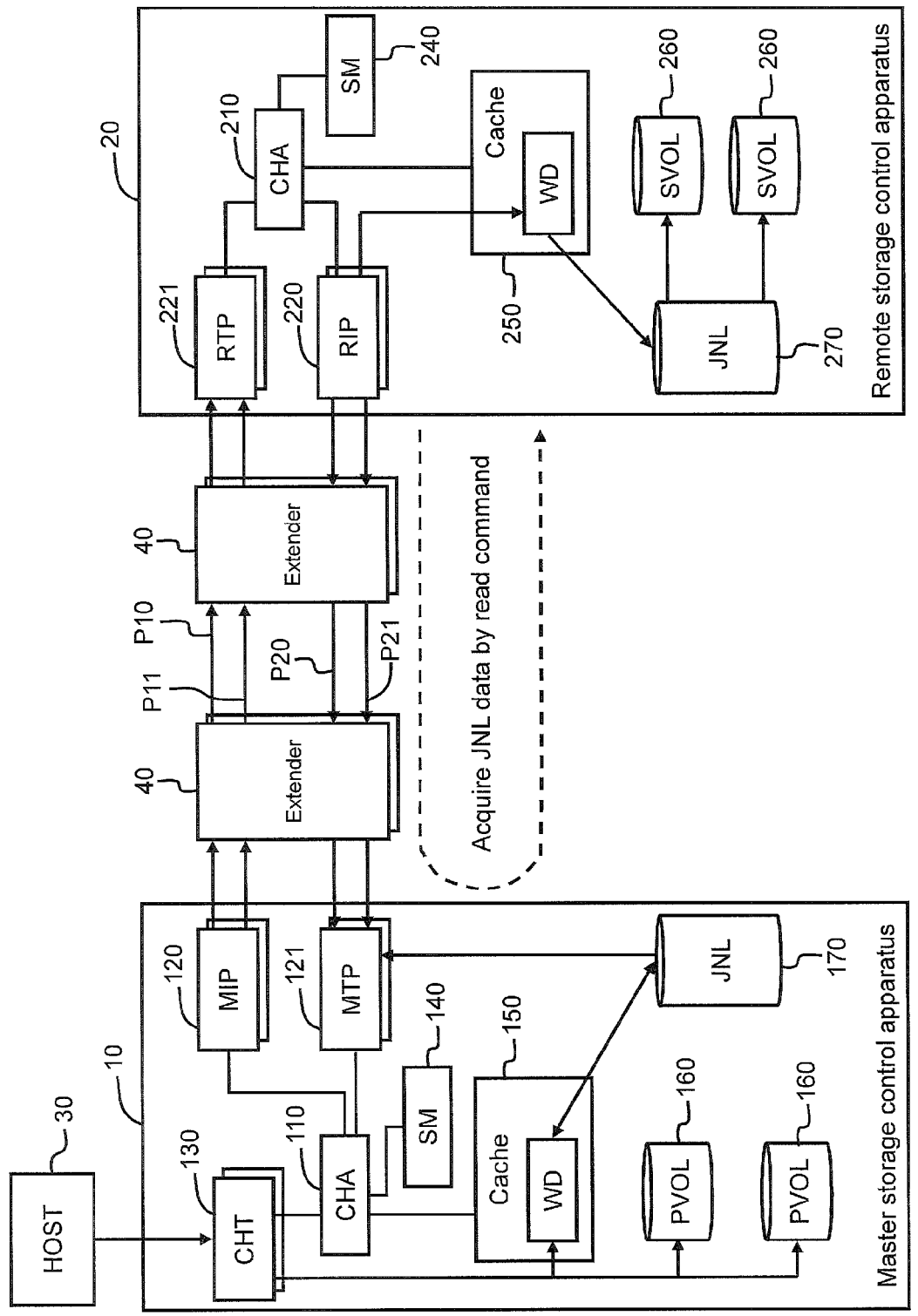
FIG. 2 is an explanatory diagram showing the schematic view of the storage system.

FIG. 2 shows the entire configuration of the computer system. Firstly, the correspondence relationship with FIG. 1 is explained below. A master storage control apparatus 10 corresponds to the primary storage control apparatus 1, a remote storage control apparatus 20 corresponds to the secondary storage control apparatus 2, and a host 30 corresponds to the host 3.

A primary volume 160 corresponds to the primary volume 1B, a primary journal volume 170 corresponds to the primary journal volume 1D, a secondary volume 260 corresponds to the secondary volume 2E, and a secondary journal volume 270 corresponds to the secondary journal volume 2C. First communication paths P10 and P11 correspond to the first communication path 4A, and second communication paths P20 and P21 correspond to the second communication path 4B. The communication port 1F1 corresponds to a communication port 120, the communication port 1F2 corresponds to a communication port 121, the communication port 2B1 corresponds to a communication port 221, and the communication port 2B2 corresponds to a communication port 220.

The detailed configurations of the master storage control apparatus 10 and the remote storage control apparatus 20 are explained later in FIG. 4 and others. The overview is firstly explained. The master storage control apparatus 10 and the remote storage control apparatus 20 are connected by way of an Extender 40.

A plurality of first communication paths P10 and P11 and a plurality of second communication paths P20 and P21 are installed between the master storage control apparatus 10 and the remote storage control apparatus 20. Although the figure appears as if two first communication paths and two second communication paths were respectively installed, the present embodiment is explained with an example where four first communication paths and four second communication paths are respectively installed.

The master storage control apparatus 10 can comprise, for example, a channel adapter 110, an initiator port 120, a target port 121, a channel port 130, a shared memory 140, a cache memory 150, a primary volume 160, and a journal volume 170.

The channel adapter (hereinafter referred to as a CHA) 110 performs write processing or read processing in accordance with commands issued from the host 30. The CHA 110 can also perform other types of processing than the write processing and the read processing, for example, status check processing and others.

The initiator port 120 is a communication port for transmitting commands and others to the remote storage control apparatus 20 by way of the first communication paths P10 and P11 between the apparatuses. The target port 121 is a port for receiving commands and others from the remote storage control apparatus 20 by way of the second communication paths P20 and P21 between the apparatuses. The channel port 130 is a communication port for communicating with the host 30 and comprises a target attribute.

The shared memory (referred to as an SM in the FIG. 140 stores various types of management information required for managing the master storage control apparatus 10. The cache memory 150 temporarily stores write data received from the host 30, the data which is read from the primary volume 160 or the journal volume 170, and others.

The primary volume 160 stores the data used by the host 30. The journal volume 170 is made to correspond to one or a plurality of primary volumes 160 and stores the journal data corresponding to the data (write data) written to the primary volumes 160.

The overview of the remote storage control apparatus 20 is explained below. As the master storage control apparatus 10, the remote storage control apparatus 20 comprises, for example, a CHA 210, an initiator port 220, a target port 221, a shared memory 240, a cache memory 250, a secondary volume 260, and a journal volume 270. The remote storage control apparatus 20 of the present embodiment does not comprise a channel port. A channel port may also be installed in the remote storage control apparatus 20 so that the host 30 can access the remote storage control apparatus 20.

The CHA 210 issues journal data read requests from the initiator port 220 by way of the second communication paths P20 and P21, and receives journal data from the master storage control apparatus 10. When creating a volume pair, the CHA 210 sets the attribute of the secondary volume 260 in accordance with a command (a pair creation command) received from the master storage control apparatus 10 by way of the first communication paths P10 and P11. It should be noted that a journal data read request might be abbreviated to an RD JNL in the figure.

The journal data received from the master storage control apparatus 10 is stored in the journal volume 270. The journal data is written to the secondary volume 260 in order of the sequence number.

The Extender 40 is configured as a channel extender, for example. The Extender 40 relays the communication between the master storage control apparatus 10 and the remote storage control apparatus 20. The Extender 40 compresses or decompresses data and commands flowing in the communication paths P10, P11, P20, and P21 based on a specified compression algorithm.

Figure 3:
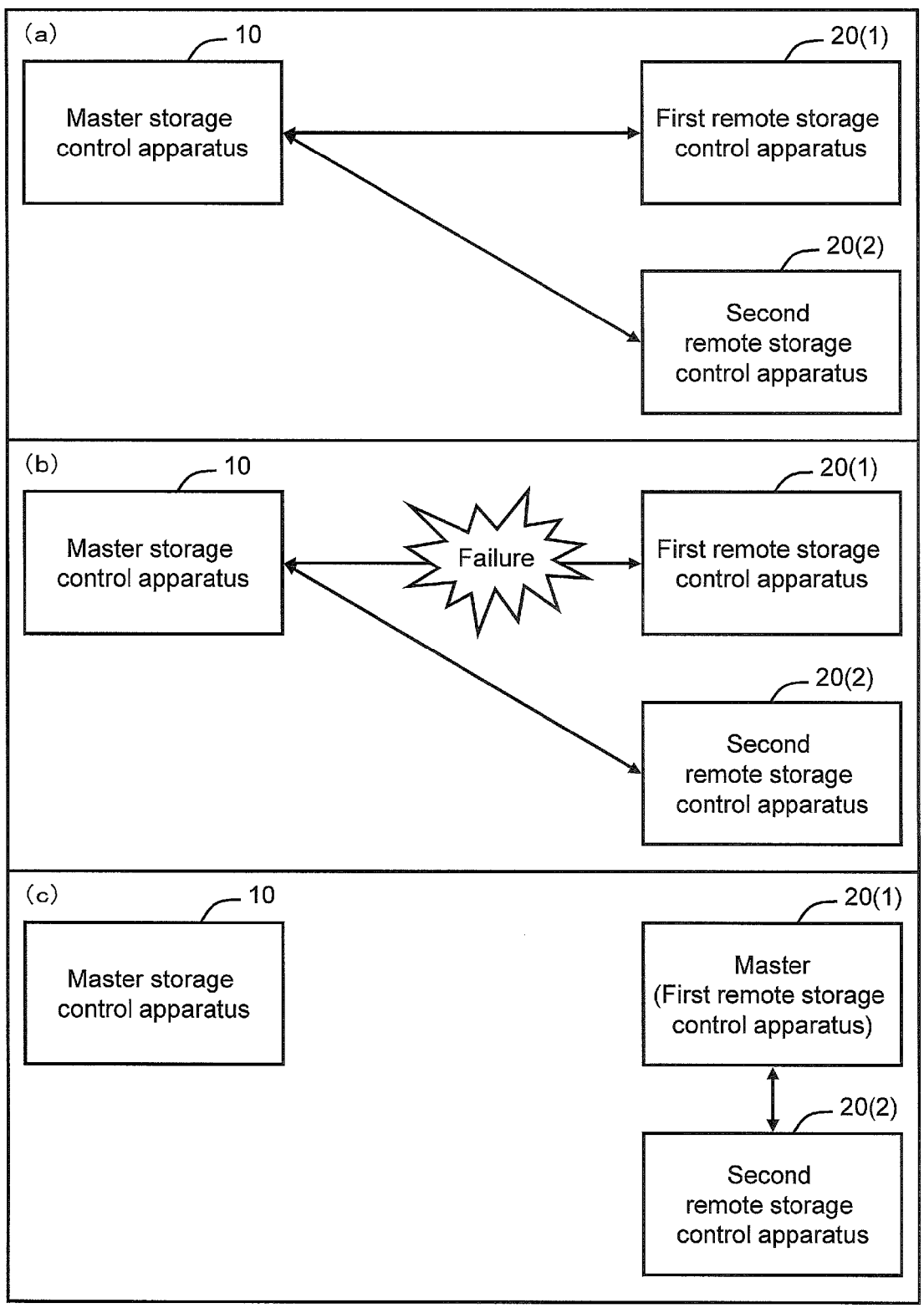
FIG. 3 is an explanatory diagram of synchronizing the volume contents among three sites.

FIG. 3 shows a frame format of a method for managing data in three storage control apparatuses 10, 20(1), and 20(2). In FIG. 3, one master storage control apparatus 10 and two remote storage control apparatuses 20(1) and 20(2) are respectively connected by way of communication paths.

In the normal status shown in FIG. 3(a), journal data is transferred from the master storage control apparatus 10 to the respective remote storage control apparatuses 20(1) and 20(2). Each of the remote storage control apparatuses 20(1) and 20(2) writes journal data to the secondary volume thereof in the correct order and makes the data of the primary volume and the data of the secondary volume consistent.

As shown in FIG. 3(b), a failure might occur in either one of or both the master storage control apparatus 10 and a communication line between the master storage control apparatus 10 and the remote storage control apparatus 20(1).

As shown in FIG. 3(c), if a failure occurs, the first remote storage control apparatus 20(1) is treated as a master storage control apparatus and is created into a pair with the second remote storage control apparatus 20(2). As explained above, normally, a first pair of the master storage control apparatus 10 and the first remote storage control apparatus 20(1) and a second pair of the master storage control apparatus 10 and the second remote storage control apparatus 20(2) perform redundant data management. If a failure occurs in the master storage control apparatus 10, a new pair is created from the first remote storage control apparatus 20(1) and the second remote storage control apparatus 20(2).

It should be noted that a remote copy technology is known as a method for synchronizing data of a plurality of volumes. By the remote copy technology, write data is transferred from the master storage control apparatus to the remote storage control apparatus and is written to the secondary volume.

Meanwhile, in the present embodiment, the secondary storage control apparatus (the remote storage control apparatus 20) reads journal data in the primary storage control apparatus (the master storage control apparatus 10) and writes the journal data to the secondary volume. By this method, the data of the primary volume 160 and the data of the secondary volume 260 become consistent.

The remote storage control apparatus 20 can read journal data from the master storage control apparatus 10 at a convenient timing for the remote apparatus and also by the transfer amount (or the transfer speed, as the case may be) in accordance with the quality and band of the communication line. However, since the configuration of the storage system, the types of business processing in the host 30, and others change variously as explained above, the setting values at the time of constructing the system eventually becomes inconsistent with the actual state. Therefore, in the present embodiment, the transfer amount of journal data which the remote storage control apparatus 20 reads from the master storage control apparatus 10 is controlled as explained below.

It should be noted that the configuration in which the secondary volume of either one of the plurality of remote storage control apparatuses 20(1) and 20(2) and the primary volume of the master storage control apparatus 10 are connected by way of the remote copy technology may also be permitted.

Figure 4:
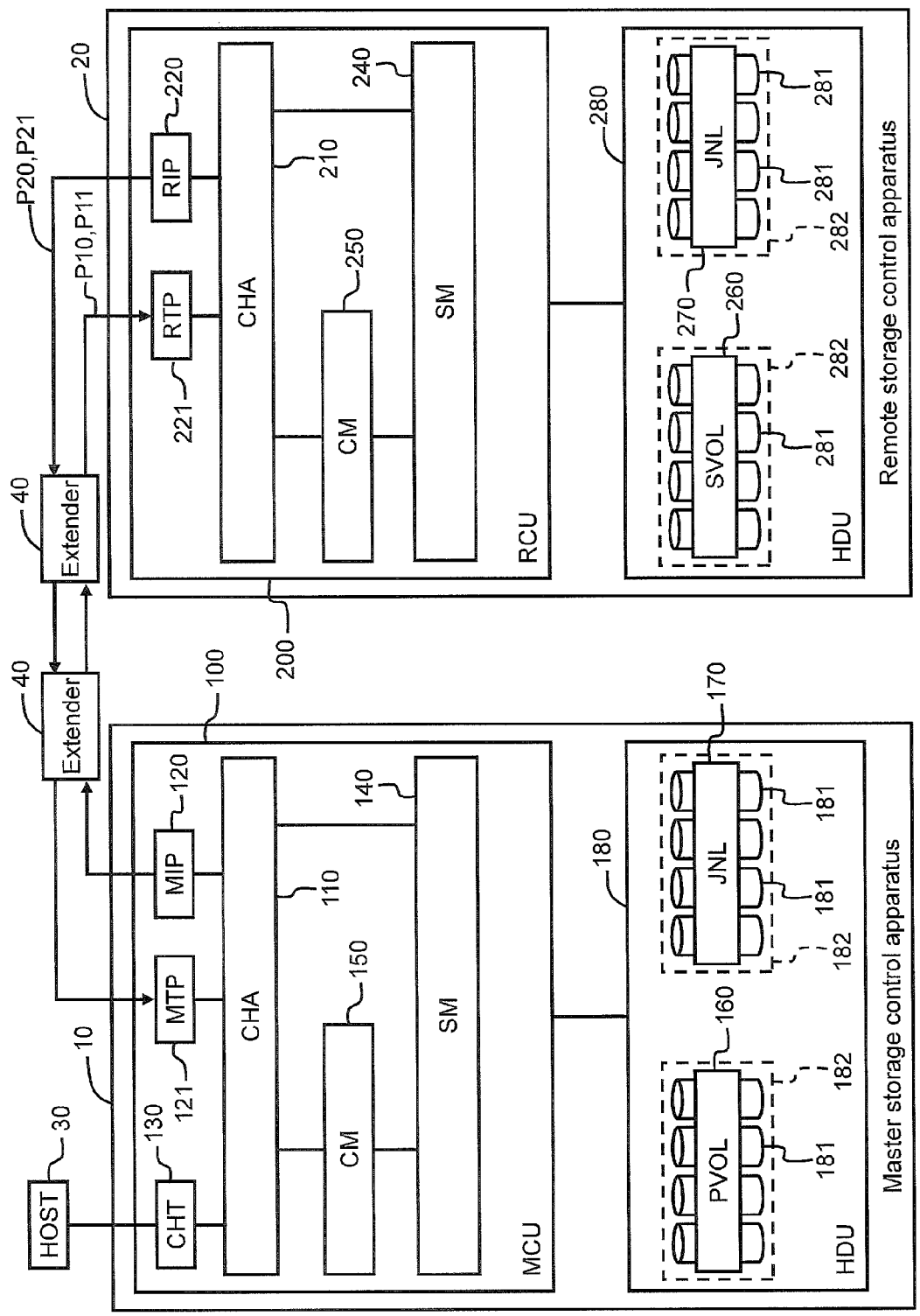
FIG. 4 is a hardware configuration diagram of the storage system.

FIG. 4 shows the hardware configuration of the storage system. The master storage control apparatus 10 comprises, for example, a controller 100 and a disk loading unit 180. The controller 100 of the master storage control apparatus 10 may also be referred to as an MCU (master control unit) 100 in the explanation below.

The MCU 100 comprises a CHA 110, an initiator port 120, a target port 121, a channel port 130, a shared memory 140, and a cache memory 150. Though not shown in the figure, the MCU 100 can further comprise a disk controller and a management interface for the connection to a management terminal.

The disk loading unit 180 comprises a plurality of storage devices 181. A RAID (Redundant Arrays of Inexpensive Disks) group 182 is created from the plurality of storage devices 181. A logical volume to be the primary volume 160 and a logical volume to be the journal volume 170 are created by using the storage area which the RAID group 182 comprises.

The remote storage control apparatus 20 also comprises a controller 200 and a disk loading unit 280 as the master storage control apparatus 10. The controller 200 might be abbreviated to an RCU (remote control unit) 200.

The RCU 200 comprises, for example, a CHA 210, an initiator port 220, a target port 221, a shared memory 240, and a cache memory 250. The RCU 200 can further comprise a disk controller and a management interface (both unshown in the figure).

Figure 5:
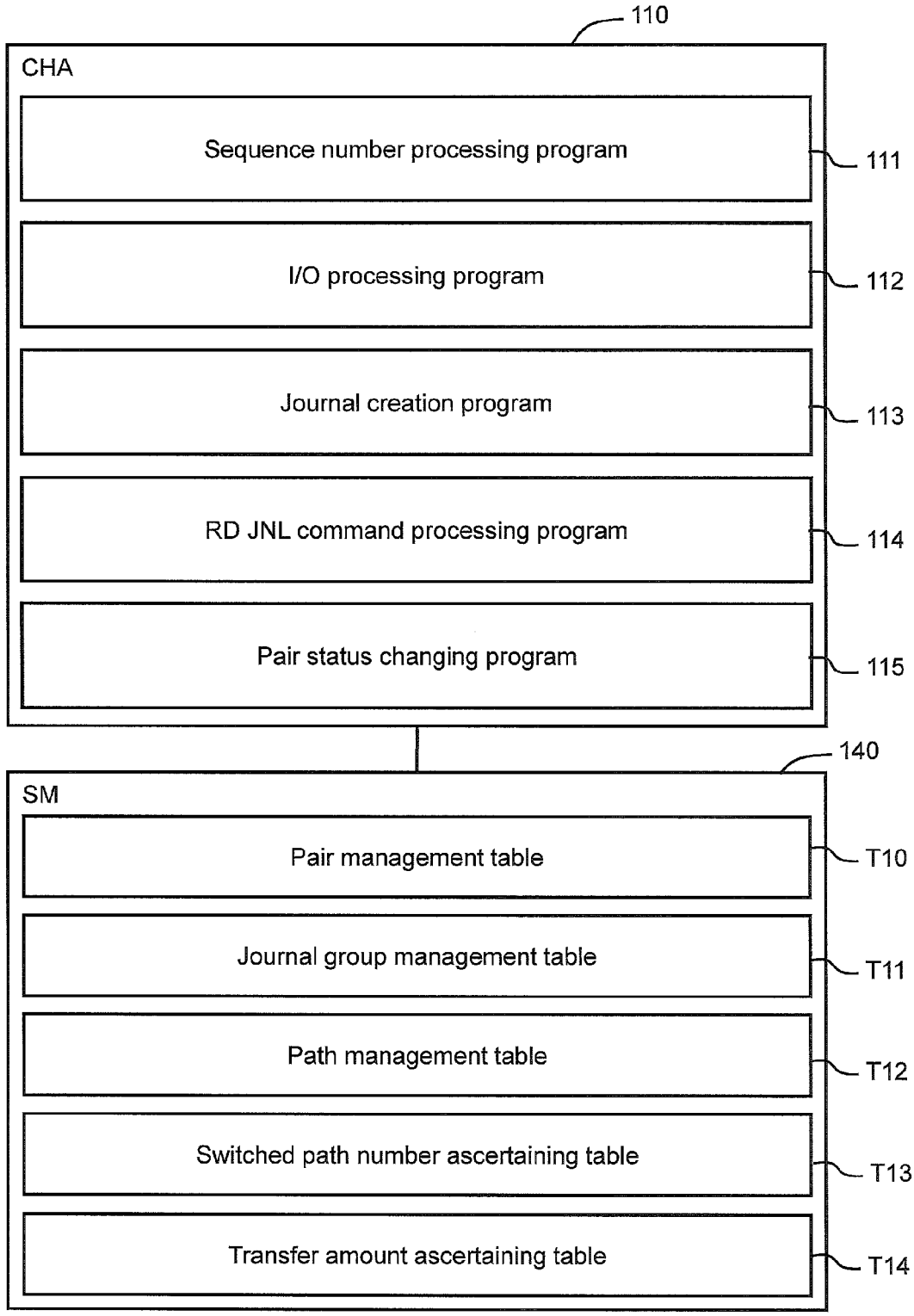
FIG. 5 is an explanatory diagram showing programs and management tables of the main site.

FIG. 5 shows the control functions from 111 to 115 and management tables from T10 to T14 which the master storage control apparatus comprises. The CHA 110 of the master storage control apparatus 10, for example, performs the computer programs for respectively realizing a sequence number processing program 111, an I/O processing program 112, a journal creation program 113, an RD JNL command processing program 114, and a pair status changing program 115.

The sequence number processing program 111 manages sequence numbers for specifying the order of updating journal data. The sequence number processing program 111 allocates a sequence number to newly created journal data.

The I/O processing program 112 processes write commands and read commands received from the host 30.

The journal creation program 113 creates journal data based on the write data which the host 30 writes to the primary volume 160 and stores the journal data in the journal volume 170.

The RD JNL command processing program 114 takes journal data from the journal volume 170 based on the RD JNL command (the journal data read request) received from the remote storage control apparatus 20, and transfers the data to the remote storage control apparatus 20.

The pair status changing program 115 manages status transition of volume pairs of the primary volumes 160 and the secondary volumes 260. The main types of status transition are explained later in FIG. 7.

In the shared memory 140 of the master storage control apparatus 10, for example, a pair management table T10, a journal group management table T11, a path management table T12, a switched path number ascertaining table T13, and a transfer amount ascertaining table T14 are stored.

The pair management table T10 is the information for managing the volume pair status. The details of the pair management table T10 are explained in FIG. 8.

The journal group management table T11 is the information for managing journals. The details of the journal group management table T11 are explained in FIG. 10.

The path management table T12 is the information for managing the communication path status between the master storage control apparatus 10 and the remote storage control apparatus 20. The details of the path management table T12 are explained in FIG. 11.

The switched path number ascertaining table T13 is the information used for determining the number of communication paths whose communication direction is to be switched among a plurality of first communication paths P10 and P11. The details of the switched path number ascertaining table T13 are explained in FIG. 12.

The transfer amount ascertaining table T14 is the information used for ascertaining the journal data transfer amount. The details of the transfer amount ascertaining table T14 are explained in FIG. 13 and in FIG. 14.

Figure 6:
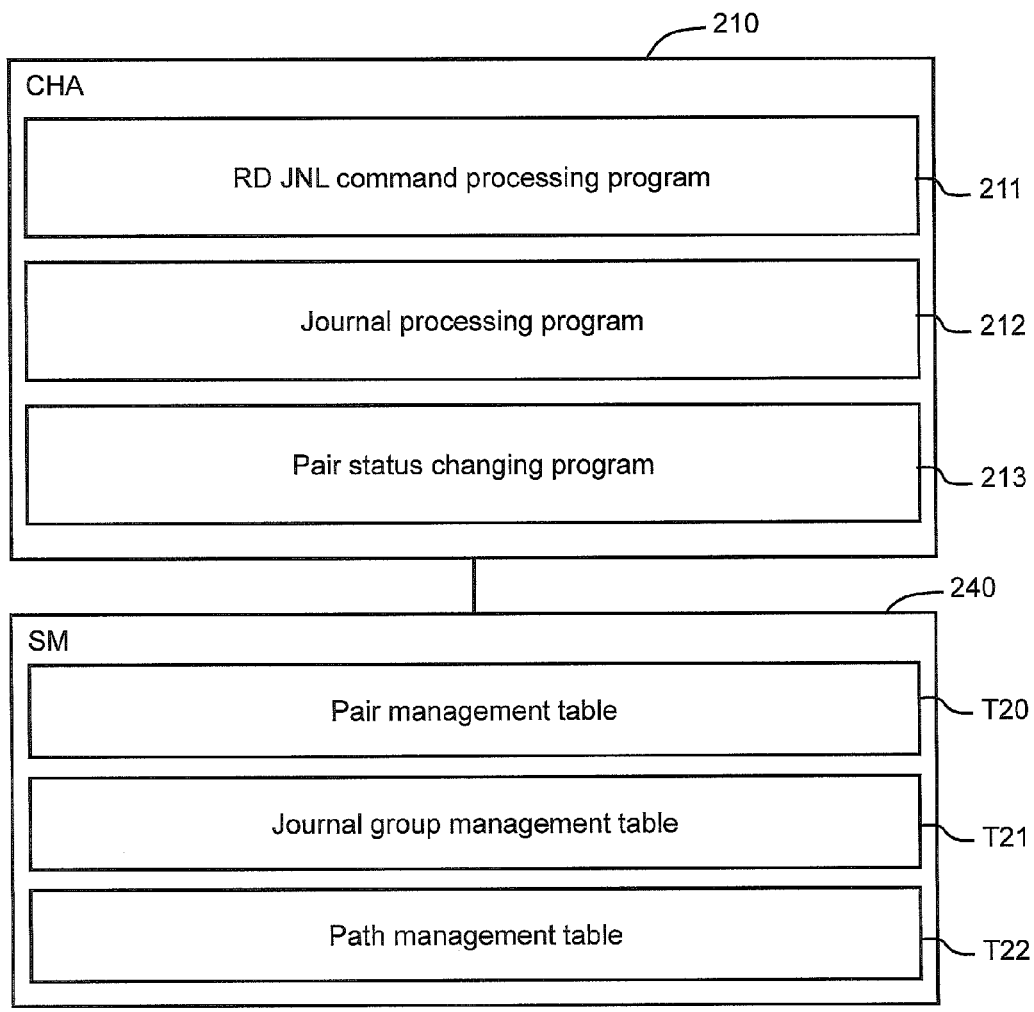
FIG. 6 is an explanatory diagram showing programs and management tables of the remote site.

FIG. 6 shows control functions from 211 to 213 and management tables from T20 to T22 which the remote storage control apparatus 20 comprises. The CHA 210 of the remote storage control apparatus 20 comprises, for example, an RD JNL command processing program 211, a journal processing program 212, and a pair status changing program 213.

The RD JNL command processing program 211 issues RD JNL commands. The journal processing program 212 writes journal data stored in the secondary journal volume 270 to the secondary volume 260 in the correct order. The pair status changing program 213 manages status transition of volume pairs.

The shared memory 240 of the remote storage control apparatus 20 stores, for example, a pair management table T20, a journal group management table T21, and a path management table T22. The details of the pair management table T20 are explained in FIG. 9. Since the journal group management table T21 and the path management table T22 are the same as the journal management table T11 and the path management table T12 which the master storage control apparatus 10 comprises, the explanation thereof is omitted.

Figure 7:
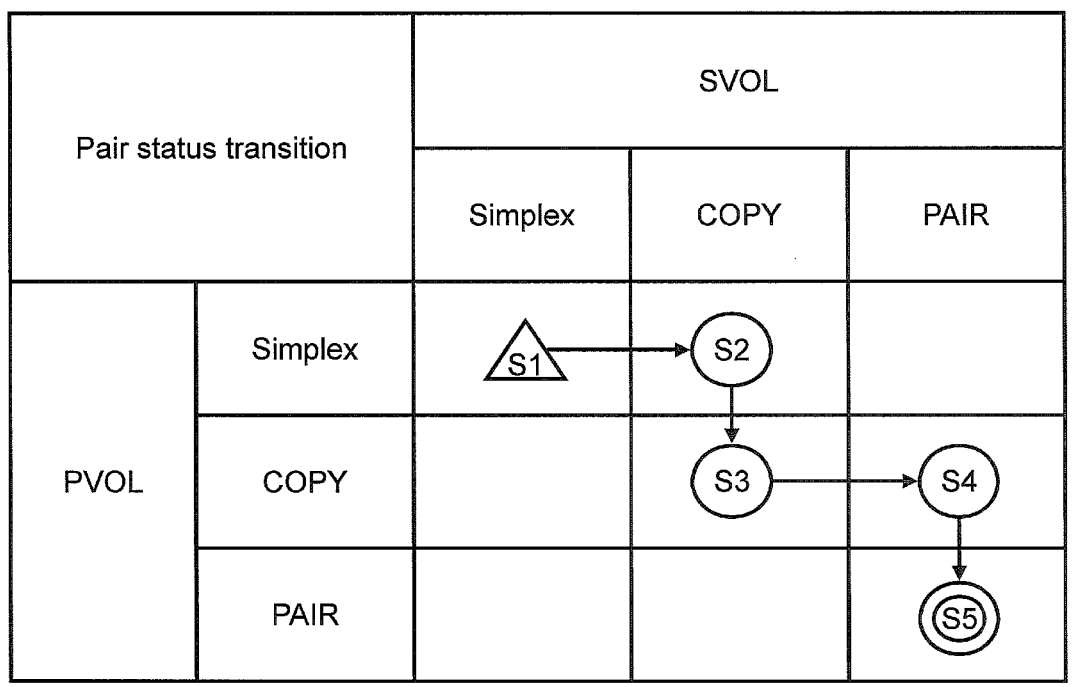
FIG. 7 is a diagram of pair status transition.

FIG. 7 shows main status transition of volume pairs. In FIG. 7, "Simplex", "COPY", and "PAIR" are shown as the pair statuses. "Simplex" indicates the status in which no pair is configured. It is indicated that a volume in "Simplex" is a normal logical volume.

"COPY" indicates that the copy between volumes is in progress. "PAIR" indicates that the copy between the volumes is completed and that the data of the respective volumes configuring the volume pair is consistent.

The pair status changes as S1, S2, S3, S4, and S5 shown in FIG. 7. The first status S1 is the status before the primary volume 160 and the secondary volume 260 are created into a pair. The second status S2 is the status in which the secondary volume 260 changes to "COPY" while the primary volume 160 remains "Simplex". The third status S3 is the status in which the primary volume 160 also changes to "COPY". The fourth status S4 is the status in which the secondary volume 260 changes to "PAIR". The fifth status S5 is the status in which the primary volume 160 also changes to "PAIR".

At this point, when the first status S1 changes to the second status S2, a command is transmitted from the master storage control apparatus 10 to the remote storage control apparatus 20 by way of the first communication paths P10 and P11. Specifically speaking, the first communication paths P10 and P11 are used if a volume pair is created. In the statuses from S2 to S5 after the volume pair is created, RD JNL command transmission and journal data transfer are performed by using the second communication paths P20 and P21. Therefore, as explained later, the present embodiment pays attention to the first communication paths P10 and P11 which are not used after the volume pair is created, and uses all or a part of the first communication paths as second communication paths.

FIG. 8 shows the configuration of the pair management table T10 which the master storage control apparatus 10 maintains. The pair management table T10, for example, manages a primary volume number C100, a volume attribute C101, a journal group number C102, a pair status C103, a processing status C104, a secondary volume number C105, and a secondary journal group number C106 by making the above correspond to one another.

The primary volume number C100 is the information for identifying a volume in the master storage control apparatus 10. The volume attribute C101 indicates the attribute of the volume. The volume attributes are, for example, "primary volume", "unused volume", "abnormality occurrence", and others. The journal group number C102 is the information for identifying a journal group to which the primary volume belongs. As explained below, a plurality of primary volumes 160 can be registered in one journal group.

The pair status C103 indicates the status of the volume pair. The pair statuses are explained in FIG. 7. The processing status C104 indicates the status of the processing. The processing statues are, for example, "copying", "creating pair", and others.

The secondary volume number C105 is the information for identifying a volume in the remote storage control apparatus 20. The journal group number C106 is the information for identifying a journal group to which the volume in the remote storage control apparatus 20 belongs.

FIG. 9 shows the configuration of the pair management table T20 which the remote storage control apparatus 20 maintains. The secondary pair management table T20 is configured corresponding to the primary pair management table T10. Specifically speaking, the pair management table T20 manages a secondary volume number C200, a volume attribute C201, a journal group number C202, a pair status C203, a processing status C204, a primary volume number C205, and a primary journal group number C206 by making the above correspond to one another. Since the respective types of information from C200 to C206 are the same as the respective types of information explained in FIG. 8, the explanation thereof is omitted.

FIG. 10 shows the configuration of the journal group management table T11 which the master storage control apparatus 10 maintains. A bitmap indicating each of the journal volumes 170 registered in the journal group is valid or invalid is stored in a word 0 and a word 1. A bit 1 is set for a valid journal volume 170. A bit 0 is set for an invalid journal volume 170.

A journal group status, a processing type, and an abnormality code are stored in a word 2. The journal group statuses are, for example, "Initial", "Active", "HaltAccept", "Halting", "Halt", "Stopping", "Stop" and others.

"Initial" indicates a journal group in the initial status. Only a journal volume is registered in the journal group in the initial status, and no data volume (primary volume or secondary volume) is registered.

"Active" indicates a status that a volume pair is created and that a primary volume or a secondary volume is registered in the journal group. "Active" indicates either of the following two statuses. The first is the status in which data copy is in progress between the primary volume 160 and the secondary volume 260 and the data is not consistent between the primary volume 160 and the secondary volume 260. The second is the status in which initial copy (creation copy) is completed between the primary volume 160 and the secondary volume 260 and the data is consistent between the primary volume 160 and the secondary volume 260.

"HaltAccept" indicates the status in which volume pair suspend is started, and subsequently the status immediately changes to "Halting". Since volume pair suspend or volume deletion is being performed in the "Halting" status, the data is not consistent between the primary volume 160 and the secondary volume 260. When the volume pair is to be changed to suspend, the status changes in order of "Halting", "Halt", and "Stopping", and changes to "Stop" when suspend is completed. When the volume pair is to be deleted, the status changes in order of "Halting", "Halt", and "Stopping", and changes to "Initial" when deletion is completed.

"Halt" indicates the status in which mirror split or deletion is in progress. "Stopping" indicates the status in which volume pair suspend or deletion is in progress. "Stop" indicates the status in which volume pair suspend or deletion is completed. In the "Halt", "Stopping", and "Stop" statuses, the data is not consistent between the primary volume 160 and the secondary volume 260.

In the processing type managed in the word 2, the distinction between being used by what is called an open host or being used by a mainframe is stored. The information indicating the type of failure or abnormality is stored in the abnormality code.

The volume numbers of the journal volumes registered in the journal group are stored in the words from 3 to 66. The respective bits in the bitmap shown in the word 0 and word 1 correspond to the journal volumes shown in the words from 3 to 66.

The time at which the journal group is registered is stored in a word 67. The time which the journal group is deleted is stored in a word 68. The number of data volumes registered in the journal volume is stored in a word 69. The data volume indicates the logical volume in which a journal is managed.

The monitoring time after the journal volume 170 becomes full is stored in a word 70. Even if the journal volume 170 becomes temporarily full, the usage rate of the journal volume 170 becomes lower than full as the journal data is read from the remote storage control apparatus 20. Meanwhile, if the journal volume 170 becomes full due to overload, communication failure, or other causes of the remote storage control apparatus 20, the fullness is not temporary. Therefore, the monitoring time for determining whether the journal volume 170 is temporarily full or not is set for a word 70.

The monitoring time after the cache memory 150 becomes overloaded is stored in a word 71. The cache memory 150 being overloaded indicates that the free cache area becomes scarce. The monitoring time for determining whether the overload status of the cache memory 150 is temporary or not is set for a word 71.

A journal data transfer speed TS is stored in a word 72. As the size of the journal data amount transferred at a time is determined in accordance with the transfer speed, the transfer speed TS indicates the journal data transfer amount. The transfer speed TS is selected by the user such as a system administrator from such values as 256 Mbps, 100 Mbps, and 10 Mbps or a range prepared in advance.

If the band of the communication line between the master storage control apparatus 10 and the remote storage control apparatus 20 is wide, the user can select, for example, 256 Mbps as the transfer speed TS.

If the 256 Mbps is selected as the transfer speed TS, for example, journal data is transferred from the master storage control apparatus 10 to the remote storage control apparatus 20 in size of 1 MB. By this method, the data written to the primary volume 160 is also written to the secondary volume 260 relatively quickly and the data becomes consistent between both of the volumes.

If the band of the communication line between the master storage control apparatus 10 and the remote storage control apparatus 20 is narrow, the user can select, for example, 10 Mbps as the transfer speed TS. In this case, for example, journal data is transferred in size of 256 KB.

If the band of the communication line between the master storage control apparatus 10 and the remote storage control apparatus 20 is medium, the user can select, for example, 100 Mbps. In this case, for example, journal data is transferred in size of 500 KB. By this method, the time until the data written to the primary volume 160 is reflected in the secondary volume 260 (data reflection time) becomes longer. For example, if a volume pair needs to be operated as long as the communication is not affected even if the data reflection time becomes longer, the lowest speed is set for the transfer speed TS.

A journal sequence number is stored in a word 73. The journal sequence number is issued at the point of time when a slot in the cache memory 150 is secured. A sequence number which can be copied is stored in a word 74. A copied sequence number is stored in a word 75. Specifically speaking, the sequence number of the journal data transferred to the remote storage control apparatus 20 is stored.

A purged sequence number is stored in a word 76. The purged sequence number is the sequence number of the journal data which is confirmed to have been written to the secondary volume 260 and therefore is deleted from the journal volume 170.

A word 77 and a word 78 store the information used in the remote storage control apparatus 20. A read sequence number is stored in the word 77. The read sequence number indicates a sequence number of the journal data read from the journal volume 170 by the remote storage control apparatus 20. A restored sequence number is stored in the word 78. The restored sequence number is a sequence number of the journal data written to the secondary volume 260.

The number of journal data is stored in a word 79. Bitmaps indicating whether the data volumes registered in the journal group are valid or invalid are stored in words from 80 to 2127.

The usage rate of the journal volume 170 of the master storage control apparatus 10 is stored in a word 4175. The usage rate of the journal volume 270 of the remote storage control apparatus 20 is stored in a word 4176.

The average response time to an RD JNL command is stored in a word 4177. The response time to an RD JNL command indicates the time required since the RD JNL command is issued until journal data is received.

A switching possibility flag, the number of communication paths whose switching is to be allowed, and a flag indicating whether the communication paths are being used or not are stored in the last word 4178.

The switching possibility flag is the information indicating whether switching the communication direction of the communication paths is allowed or not. If switching the communication paths is allowed, the communication direction of a part or all of the first communication paths is reversed by the path switching processing explained later.

Figure 11:
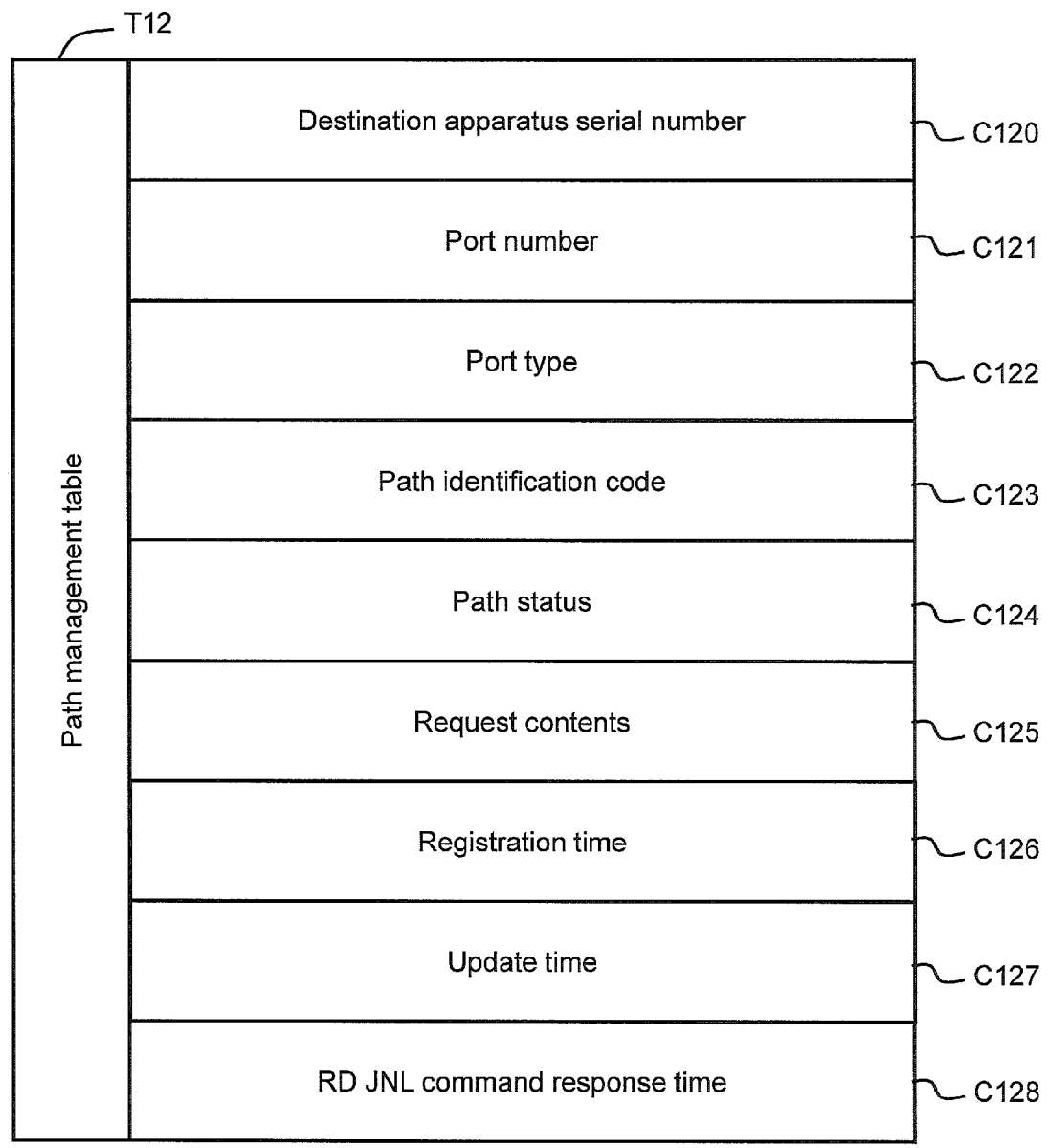
FIG. 11 shows a table for managing a communication path.

FIG. 11 shows the configuration of the path management table T12. The path management table T12 is prepared for each of the communication paths. FIG. 11 shows one path management table T12. The path management table T12 manages, for example, a destination apparatus serial number C120, a port number C121, a port type C122, a path identification code C123, a path status C124, a request contents C125, a registration time C126, an update time C127, and command response time to an RD JNL command C128 by making the above correspond to one another.

The destination apparatus serial number C120 is a number for identifying a storage control apparatus of the destination of the communication. Since this is the path management table T12 in the master storage control apparatus 10, a serial number of the remote storage control apparatus 20 is stored in the apparatus serial number C120.

The port number C121 is the information for identifying the communication port for which a communication path is set. The port type C122 is the information indicating whether the communication port attribute is an initiator or a target. The path identification code C123 is the information for identifying a communication path. The path status C124 indicates the communication path status. The communication path statuses are, for example, a normal status and an abnormal status.

The request contents C125 is the information indicating whether the request is a communication path creation request or a communication path deletion request. The registration time C126 indicates the point of time at which the communication path is registered. The update time C127 indicates the point of time at which the contents of the path management table T12 are updated. The RD JNL command response time indicates the response time to the RD JNL command in case the communication path is used.

FIG. 12 shows the configuration of the switched path number ascertaining table T13. The switched path number ascertaining table T13 manages, for example, a journal volume usage rate C130, a journal input/output ratio C131, a number of first communication paths C132, and a number of paths to be switched C133 by making the above correspond to one another. FIG. 12 shows main combinations among combinations of journal volume usage rates and journal input/output ratios.

The journal volume usage rate C130 is the information indicating the usage rate of the journal volume 170 of the master storage control apparatus 10. The present embodiment classifies the usage rate of the journal volume 170 into ranks. The journal volume usage rate is classified into such ranks as "overload" in case the usage rate is 70%, "medium load" in case the usage rate is 10 to 69%, and "low load" in case the usage rate is lower than 10%.

The journal input/output ratio C131 is a ratio between the journal data amount per unit of time stored in the journal volume 170 (creation speed) and the amount read from the journal volume 170 per unit of time (reading speed). Hereinafter, the journal input/output ratio might be abbreviated to a JA.

The number of paths C132 indicates the number of first communication paths for issuing commands from the master storage control apparatus 10 to the remote storage control apparatus 20. The number of paths to be switched C133 indicates the number of communication paths whose communication direction is to be reversed among the first communication paths.

In the example shown in FIG. 12, if the journal volume usage rate is overload and the journal input/output ratio JA is 2 or more, the communication direction of all of the four first communication paths is reversed.

Even if the journal volume usage rate is overload, the communication direction of the first communication path is not switched if the journal input/output ratio JA is smaller than 2. This is because the journal volume usage rate is predicted to decrease eventually as the journal data is read from the journal volume 170 in course of time. For switching the communication direction of the communication paths, the port attribute must be changed, which causes the cost of switching. Therefore, in the present embodiment, the switching cost is reduced and only the communication direction of the appropriate number of communication paths is switched.

If the journal volume usage rate is medium load and, at the same time, the journal input/output ratio JA is larger than 0.5 and smaller than 2, the communication direction of half of the four first communication paths is switched.

If the journal volume usage rate is low load and, at the same time, the journal input/output ratio JA is smaller than 0.5, the communication direction of the first communication paths is not switched. The other combinations than shown in FIG. 12 have only to be set to ensure the communication direction of the appropriate number of first communication paths is switched considering the switching cost and the inhibition of communication failures.

FIG. 13 shows the configuration of the transfer amount ascertaining table T14. The transfer amount ascertaining table T14 manages, for example, a primary journal volume usage rate C140, a secondary journal volume usage rate C141, and a ratio C142 by making the above correspond to one another.

The primary journal volume usage rate C140 manages the usage rate of the journal volume 170 in the master storage control apparatus 10 by classifying the usage rate into ranks. The secondary journal volume usage rate C141 manages the usage rate of the journal volume 270 in the remote storage control apparatus 20 by classifying the usage rate into ranks. The ratio C142 manages the ratio to the previous journal data transfer amount.

If the usage rate C140 of the primary journal volume 170 is overload and the usage rate C141 of the secondary journal volume 270 is also overload, the ratio C142 is set as 30%. Therefore, 30% of the previous journal data transfer amount is set as a new journal data transfer amount.

The table T14 shown in FIG. 13 is set to ensure that the value of the journal data transfer amount becomes smaller as the loads of the primary and secondary journal volumes 170 and 270 become larger.

Figure 14:
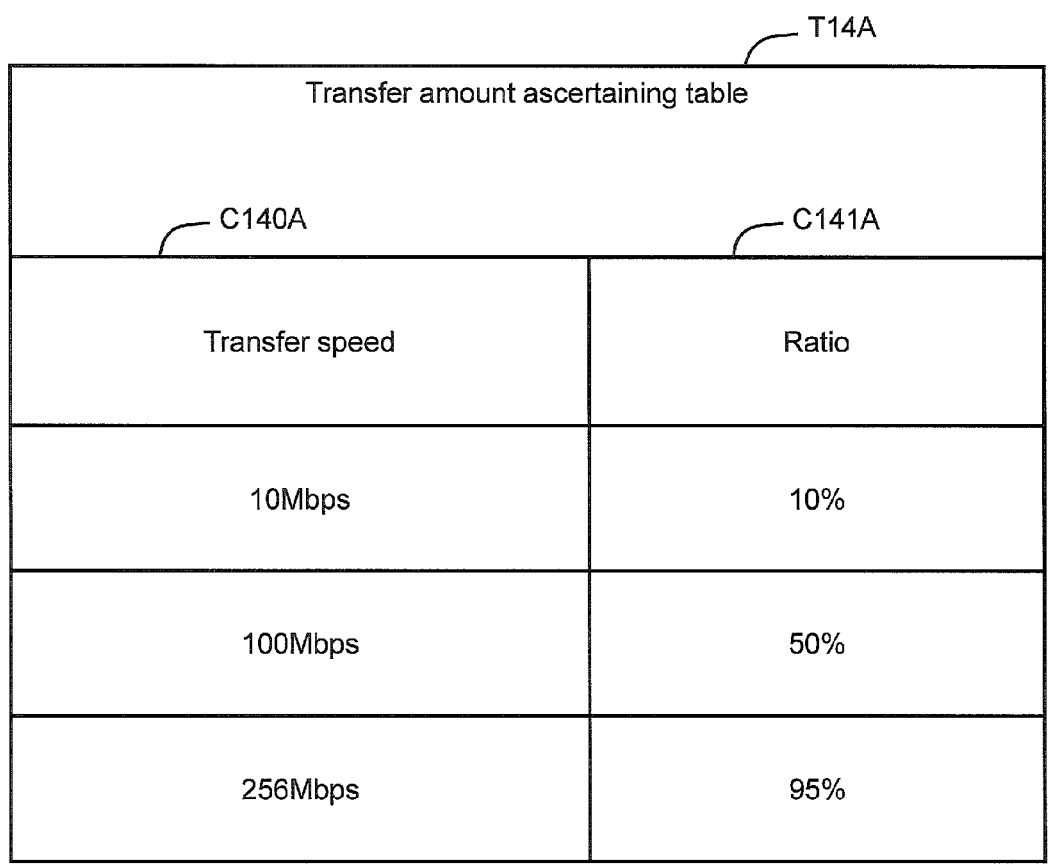
FIG. 14 shows another table used in case of adjusting the journal data transfer amount.

FIG. 14 shows the configuration of another transfer amount ascertaining table T14A. The transfer amount ascertaining table T14A manages a previous transfer speed TS C140A and a ratio C141A by making the above correspond to each another. For example, such values as 256 Mbps, 100 Mbps, and 10 Mbps are set as the transfer speed TS. The ratio for determining by which degree the journal data transfer speed is to be decreased is stored in the ratio C141A.

At this point, FIG. 14 makes the value of the adjustment ratio C141A smaller as the journal data transfer speed is slower. For example, if journal data transfer in units of 256 Mbps fails, the transfer speed is decreased to 95%. Meanwhile, if journal data transfer in units of 10 Mbps fails, the transfer speed is decreased to 10%. This is to improve the transfer success rate by significantly decreasing the transfer speed because the transfer failed in spite of transferring journal data at a lowest speed.

It should be noted that the methods shown in FIG. 13 and FIG. 14 are merely examples, and the journal data transfer speed (or the transfer amount) can also be adjusted by other methods than the above. The configuration in which the values of the adjustment ratio are made different between the journal group which prioritizes reduction of data reflection time and the journal group which improves the reliability of journal data transfer may also be permitted.

FIG. 15 shows the parameter configuration of an RD JNL command issued from the remote storage control apparatus 20. A command code indicating an RD JNL command is stored in a byte 0. A mode and an extent number are stored in a byte 2.

A number of a primary journal group which is the read target is stored in a byte 3. A sequence number of the read target is stored in bytes from 4 to 9. A number indicating the order of command issuance is stored in a byte 10. A model code and a mirror number are stored in a byte 11. The model code indicates a type of a storage control apparatus.

A journal data transfer amount (transfer speed) is stored in bytes 12 and 13. The usage rate of the journal volume 270 in the remote storage control apparatus 20 is stored in a byte 14. The average response time to an RD JNL command is stored in the last byte 15.

FIG. 16 shows the parameter configuration of a response to the RD JNL command A processing code is stored in a byte 0. A sequence number of the journal data with which read is started is stored in bytes 1 and 2.

Numbers of ports connected to the communication paths whose communication direction is to be switched are stored in bytes 4 to 9. An apparatus serial number of the master storage control apparatus 10 is stored in bytes 10 to 13. An SSID (Service Set Identifier) is stored in a byte 14. An LRC (Longitudinal Redundancy Check) is stored in a byte 15.

The operation of the present embodiment is explained with reference to Figures from 17 to 24. The respective flowcharts below show the overview of the processing, and what is called those skilled in the art may be able to switch the order of steps shown in the figures, add new steps, or replace a part of the steps shown in the figures. The respective sets of the processing below are explained with the MCU 100 which is the controller of the master storage control apparatus 100 or the RCU 200 which is the controller of the remote storage control apparatus 20 as the subject of the operation.

Figure 17:
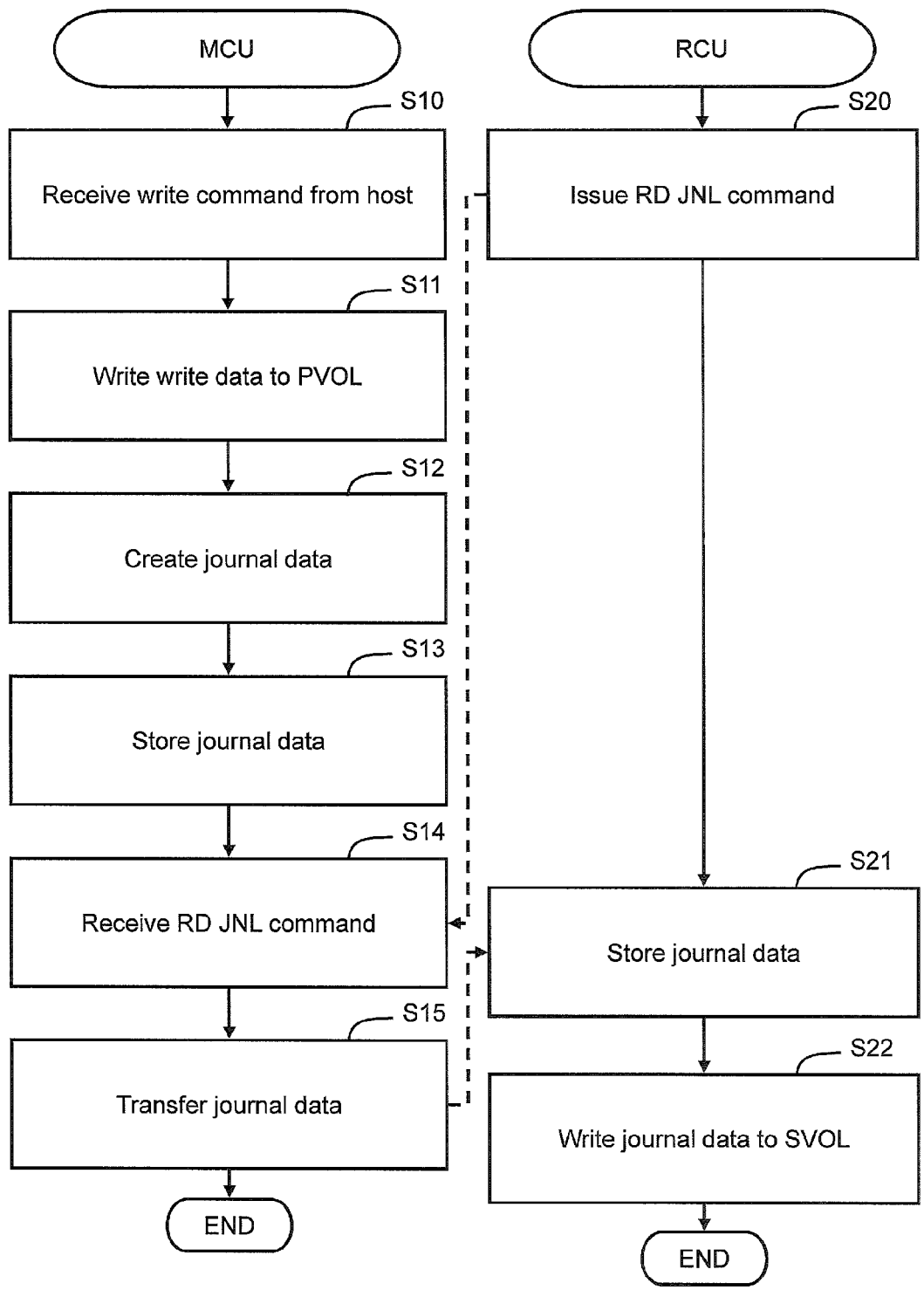
FIG. 17 is a flowchart showing the processing of creating journal data from write data.

FIG. 17 shows the processing of creating journal data in accordance with write data. Receiving a write command from the host 30 (S10), the MCU 100 writes the write data to the primary volume 160 (S11).

The MCU 100 creates journal data from write data and the journal sequence number (S12), and stores the created journal data in the journal volume 170 (S13)

The RCU 200 regularly or irregularly issues RD JNL commands to the MCU 100 (S20). Receiving an RD JNL command (S14), the MCU 100 takes a specified amount of the journal data stored in the journal volume 170 in the specified order and transfers the data to the RCU 200 (S15).

The RCU 200 stores the journal data received from the MCU 100 in the journal volume 270 (S21). The RCU 200 writes the journal data stored in the journal volume 270 to the secondary volume 260 in the specified order (S22).

Figure 18:
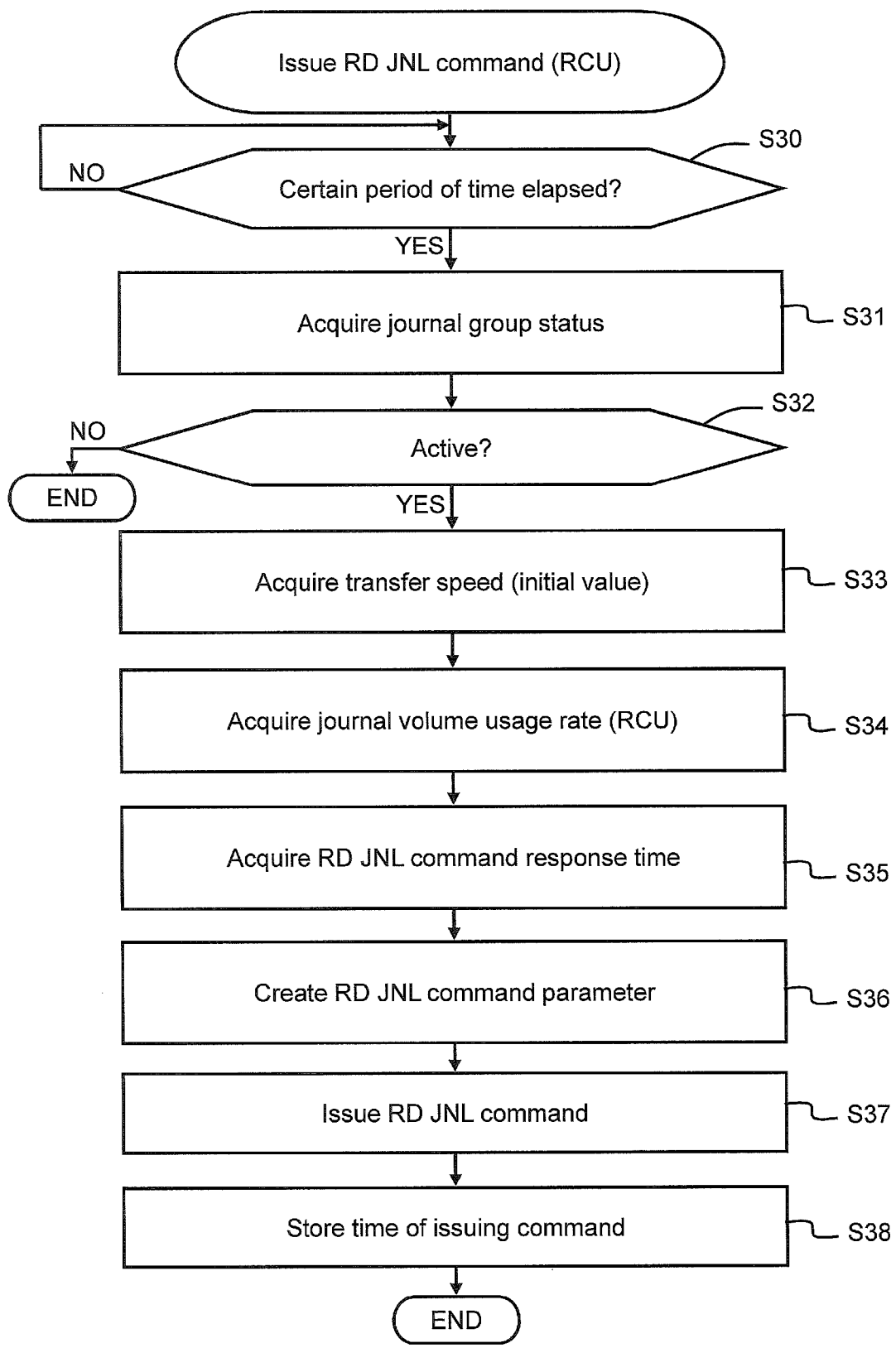
FIG. 18 is a flowchart showing the processing of issuing a journal data read request from the remote site to the main site.

FIG. 18 shows the processing in which the RCU 200 issues an RD JNL command The RCU 200 determines whether a specified length of time has elapsed or not since the previous performance (S30). If the specified length of time has elapsed (S30: YES), the RCU 200 refers to the journal group management table T21 and acquires the journal group status. As explained above, the journal group statuses are, for example, "Initial", "Active", "HaltAccept", "Halting", "Halt", "Stopping", "Stop", and others.

The RCU 200 determines whether the journal group status is "Active" or not (S32). If the journal group status is not "Active" (S32: NO), the RCU 200 terminates this processing.

If the journal group status is "Active" (S32: YES), the RCU 200 acquires the transfer speed from the journal group management table T21 (S33). The RCU 200 acquires the usage rate of the secondary journal volume 270 (S34). The RCU 200 acquires the average RD JNL command response time from the path management table T22 (S35).

The RCU 200 creates an RD JNL command parameter based on the value acquired at the above-mentioned respective steps from S33 to S35 (S36), and issues the RD JNL command to the MCU 100 (S37). The RCU 200 stores the time at which the RCU 200 issued the RD JNL command (S38).

Figure 19:
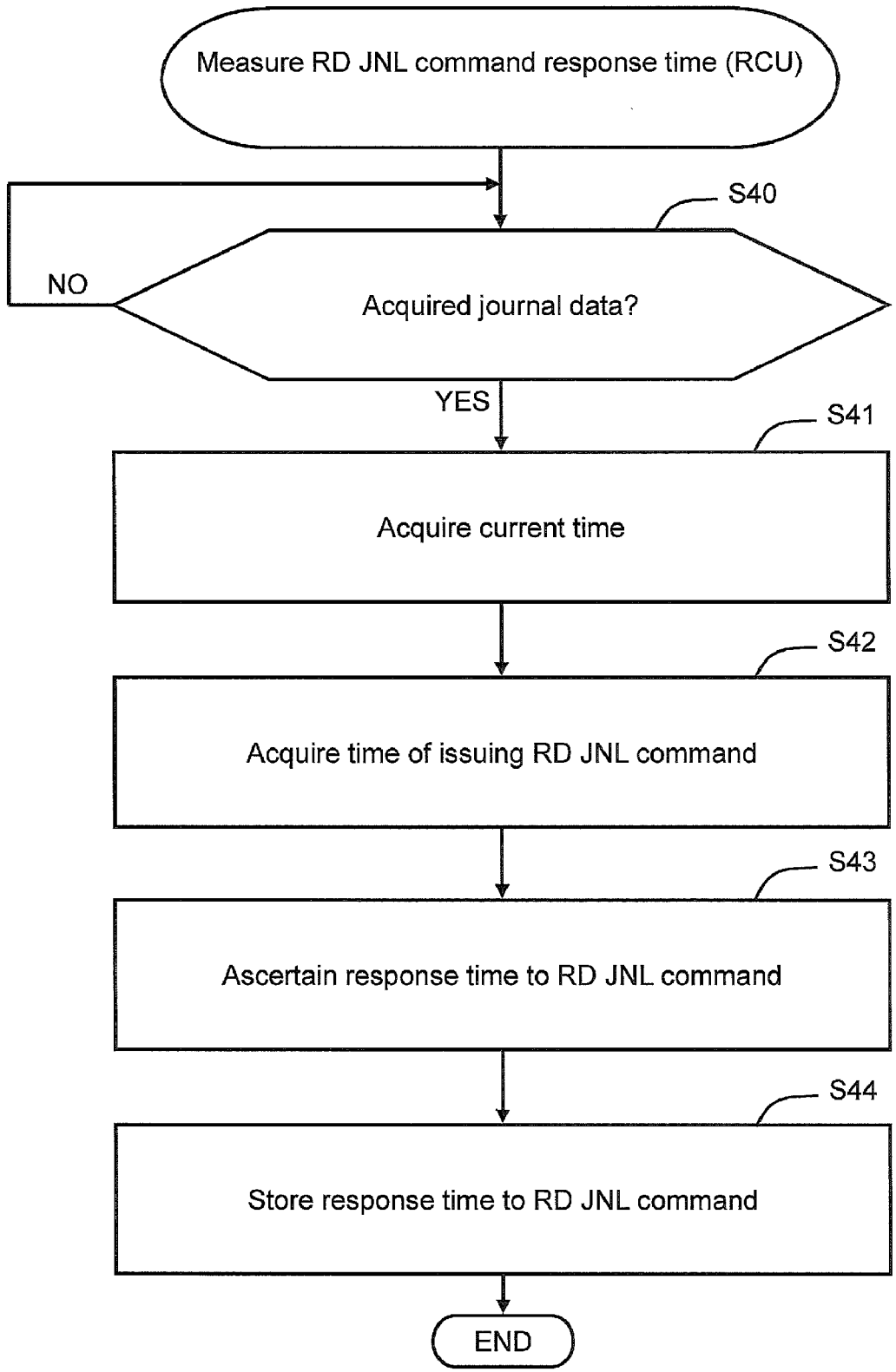
FIG. 19 is a flowchart showing the processing for measuring response time of the journal data read request.

FIG. 19 is a flowchart showing the processing in which the RCU 200 measures the response time of the MCU 100 to the RD JNL command.

The RCU 200 determines whether journal data is received from the MCU 100 or not (S40). If the journal data is received (S40: YES), the RCU 200 acquires the current time, that is, the time at which the journal data is received (S41).

Furthermore, the RCU 200 acquires the time of issuing the RD JNL command stored at S38 in FIG. 18 (S42). The RCU 200 ascertains the response time to the RD JNL command from the difference between the journal data reception time and the RD JNL command issuing time (S43), and stores the ascertained response time in the path management table T22 (S44).

Figure 20:
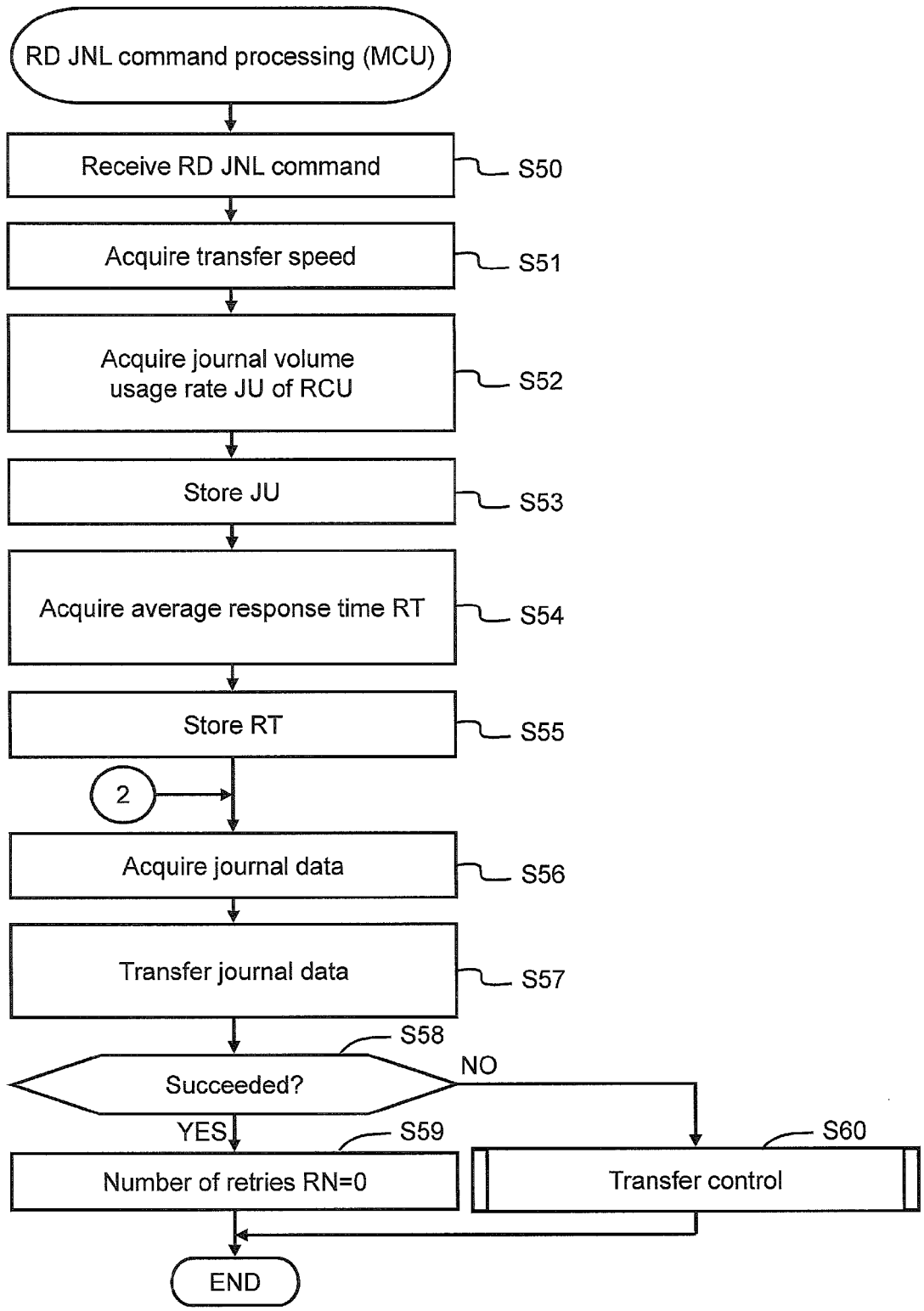
FIG. 20 is a flowchart showing the process of processing the journal data read request and transferring the journal data to the remote site.

FIG. 20 is a flowchart in which the MCU 100 processes the RD JNL command. The MCU 100 receives the RD JNL command from the RCU 200 (S50).

The MCU 100 acquires the journal data transfer speed from the RD JNL command (S51), and further acquires the secondary journal volume usage rate (S52). The MCU 100 stores the secondary journal volume usage rate in the journal group management table T11 (S53). The MCU 100 acquires the average RD JNL command response time from the RD JNL command (S54), and stores the time in the journal group management table T11 (S55).

The MCU 100 acquires the journal data in the amount according to the journal data transfer speed from the journal volume 170 (S56). The MCU 100 transfers the acquired journal data to the MCU 200 as the response to the RD JNL command (S57).

The MCU 100 determines whether the journal data transfer succeeded or not by monitoring reception notification from the RCU 200 (S58). If the journal data transfer succeeded (S58: YES), the MCU 100 resets the value of the number of retries RN for detecting communication failures (S59). The success in journal data transfer indicates that the notification that the journal data was received is transmitted from the RCU 200 within a certain period of time.

Meanwhile, if the journal data transfer fails (S58: NO), the MCU 100 performs the transfer control processing (S60).

Figure 21:
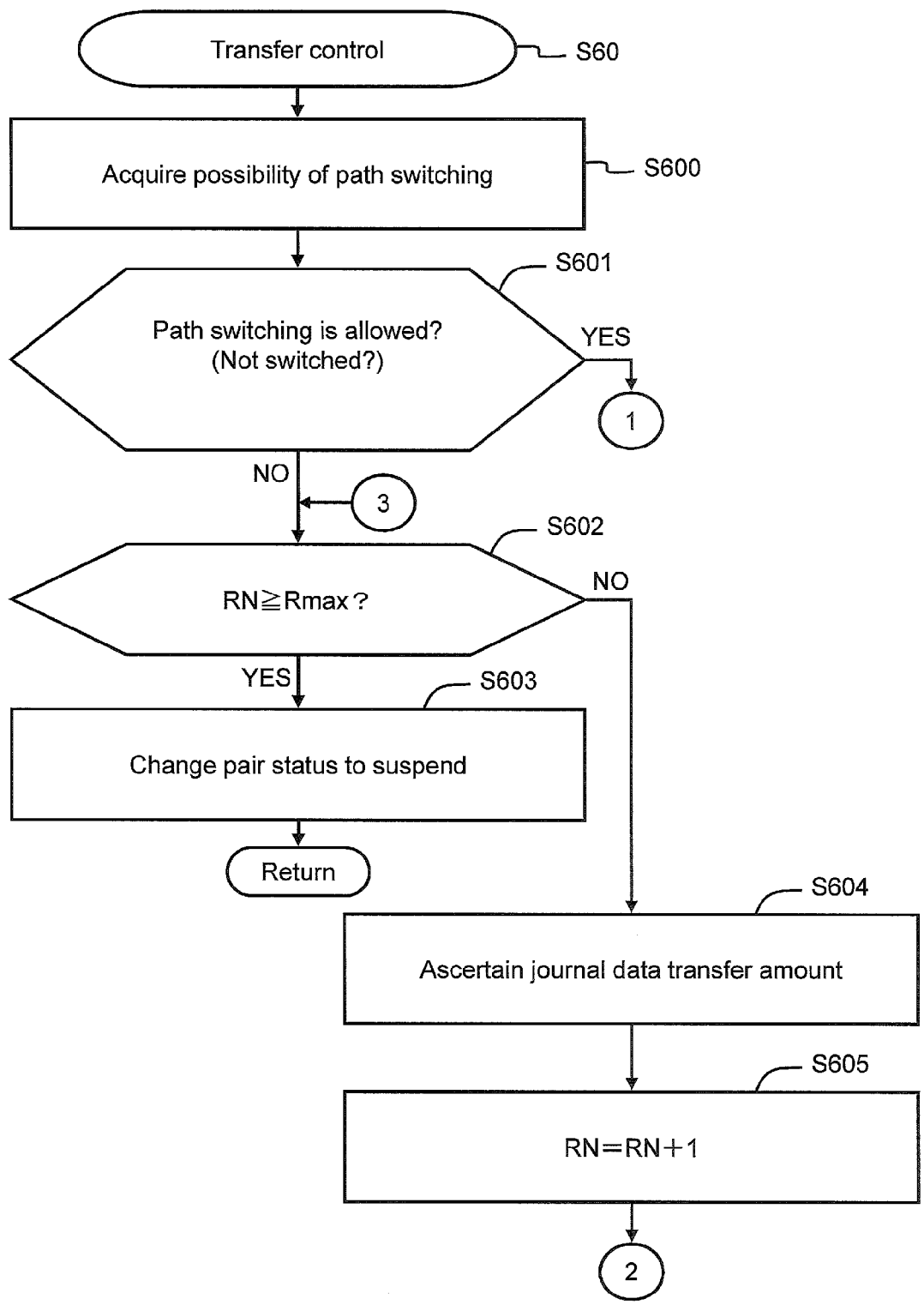
FIG. 21 is a flowchart showing the details of the transfer control processing in FIG. 20.
Figure 22:
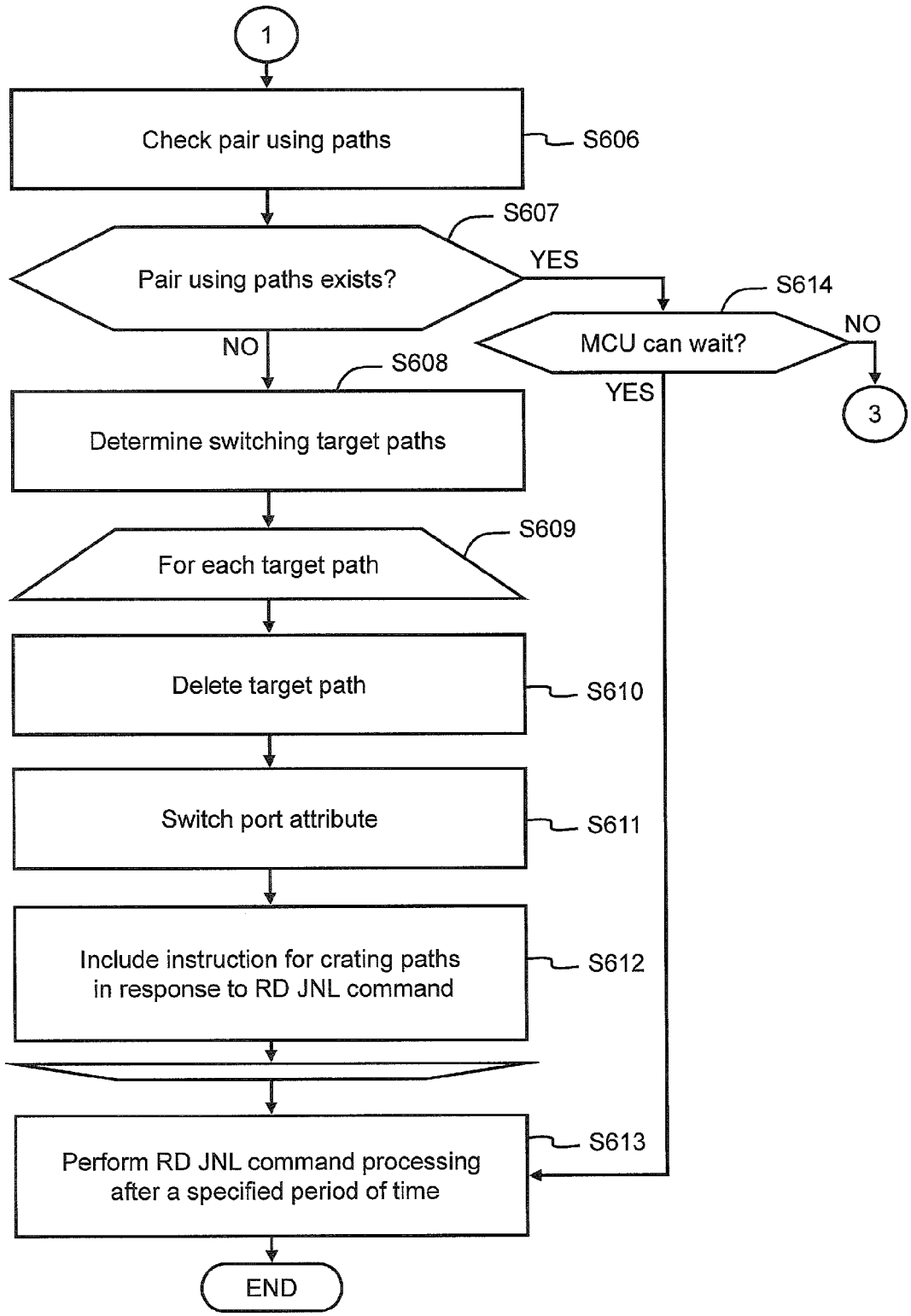
FIG. 22 is a flowchart following FIG. 21.

FIG. 21 and FIG. 22 are the flowcharts showing the details of the transfer control processing (S60). The MCU 100 acquires the flag indicating whether switching the path is possible or not from the journal group management table T11 (S600).

The MCU 100 determines whether switching the communication direction of the first communication paths is allowed or not based on the flag (S601). If switching the communication direction of the first communication paths is not allowed (S601: NO), the MCU 100 determines whether the number of retries RN has reached the specified upper limit value RNmax or not (S602). If the number of retries RN has reached the upper limit value RNmax (S602: YES), the MCU 100 determines that a failure occurred and changes the volume pair status to suspend (S603).

If the number of retries RN has not reached the upper limit value RNmax yet (S602: NO), the MCU 100 ascertains the journal data transfer amount (transfer speed) by using the transfer amount ascertaining table T14 (or T14A) (S604). The MCU 100 increments the number of retries RN by 1 (S605).

Subsequently, the MCU 100 returns to S56 in FIG. 20 by way of a connector 2, reads the journal data in the amount ascertained at the step S604 from the journal volume 170 (S56), and transfers the data to the RCU 200 (S57).

If the journal data transfer fails in spite of decreasing the journal data transfer amount (transfer speed) (S58: NO), the MCU 100 ascertains the journal data transfer amount (the transfer speed) again (S604). As explained above, if switching the first communication paths is not allowed, the journal data transfer amount (the transfer speed) is gradually decreased until the number of retries RN reaches the upper limit value RNmax.

Next, a case where switching the communication direction of the first communication paths is allowed is explained (S601: YES). In the present embodiment, the flag indicating whether switching the communication direction of the first communication paths is allowed or not is stored in the journal group management table T11 in advance.

If switching the communication direction of the first communication paths is allowed, the processing moves to the flowchart in FIG. 22 by way of the connector 1. The MCU 100 determines whether a volume pair using the first communication paths exists or not (S606).

If no volume pair using the first communication paths exists (S606: NO), the MCU 100 determines the first communication paths which are the target of switching (S608). For example, in case of switching half of the first communication paths (for example, two paths), two first communication paths are selected as the target of switching in ascending order of path identification codes. The methods for determining the switching target paths are, for example, a method using the switched path number ascertaining table T13 in FIG. 13 and a method explained in FIG. 23. Other methods than the above may also be adopted.

The MCU 100 performs the following respective steps S610, S611, and S612 for each of the switching target first communication paths (S609). Hereinafter, communication paths selected as the switching target are referred to as target paths.

Firstly, the MCU 100 deletes the target paths from the management table (S610) and switches the port attribute (S611). The master initiator port connected to the target paths is changed to a target port. The remote target port connected to the target paths is changed to an initiator port.

The MCU 100 sets the number of the remote communication port connected to the target paths in the response parameter to the RD JNL command shown in FIG. 16 (S612). The number of the remote communication port and the changed port attribute can be included in the response parameter. If the number of the switching target communication port is included in the response parameter and it is decided in advance that the RCU 200 should reverse the attribute of the communication port, the port attribute does not have to be included in the response parameter.

Even if all the first communication paths are used as the second communication paths for including the attribute change of the remote communication ports in the response to the RD JNL command, the instruction and the request from the MCU 100 can be notified to the RCU 200.

After instructing the switching of the communication direction for each of the target paths and waiting for a specified period of time, the MCU 100 re-performs the RD JNL command processing shown in FIG. 20 (S613). If the RD JNL command processing is restarted, the journal data is transferred from the MCU 100 to the RCU 200 by using the added second communication paths. Since the band of the second communication paths is extended, the possibility of success in journal data transfer increases.

It should be noted that, although the case where switching the communication direction for each of the target paths is instructed is explained in FIG. 22, instead of the above, the configuration in which switching the communication direction of all the target paths is instructed at a time may also be permitted.

Meanwhile, if a volume pair using the first communication paths exists (S607: YES), the MCU 100 determines whether the MCU 100 can wait or not (S614).

If no volume pair whose processing status C104 of the pair management table T10 is "creating pair" exists, the MCU 100 determines that the MCU 100 can wait. If any volume pair in process of creating a pair exists, the MCU 100 determines that the MCU 100 cannot wait.

If the mere volume status check is being performed by way of the first communication paths or in other cases, the use of the first communication path terminates in a relatively short time. Therefore, the MCU 100 can wait until the use of the first communication paths terminates. Meanwhile, if a volume pair is being created, a longer time is required and the MCU 100 cannot wait until the pair creation is completed.

If determining that the MCU 100 can wait (S614: YES), the MCU 100 restarts the RD JNL command processing (S613). If determining that the MCU 100 cannot wait (S614: NO), the MCU 100 returns to the step S602 in FIG. 21 by way of the connector 3.

The MCU 100 determines whether the number of retries RN has reached the upper limit value RNmax or not (S602) and, if the number of retries RN has reached the upper limit value RNmax (S602: YES), changes the pair status of the volume pair to suspend (S603).

If the number of retries RN has not reached the upper limit value RNmax (S602: NO), the MCU 100 ascertains the journal data transfer amount (the transfer speed) (S604), increments the number of retries RN by 1 (S605), and moves to S56 in FIG. 20.

As explained above, in the present embodiment, if switching the communication direction of the first communication paths is allowed, the communication direction of the first communication paths is firstly switched to extend the communication band of the second communication paths. If the journal data transfer fails even after the communication band of the second communication paths is extended (S58: NO), the transfer speed of the journal data is adjusted (S604). Therefore, at the step S601, in addition to determining whether path switching is allowed or not, it is also determined whether the paths are not switched. If the communication direction of the first communication paths is already switched, the determination at the step S601 results in NO, and therefore the processing by the MCU 100 moves to the step S602.

Figure 23:
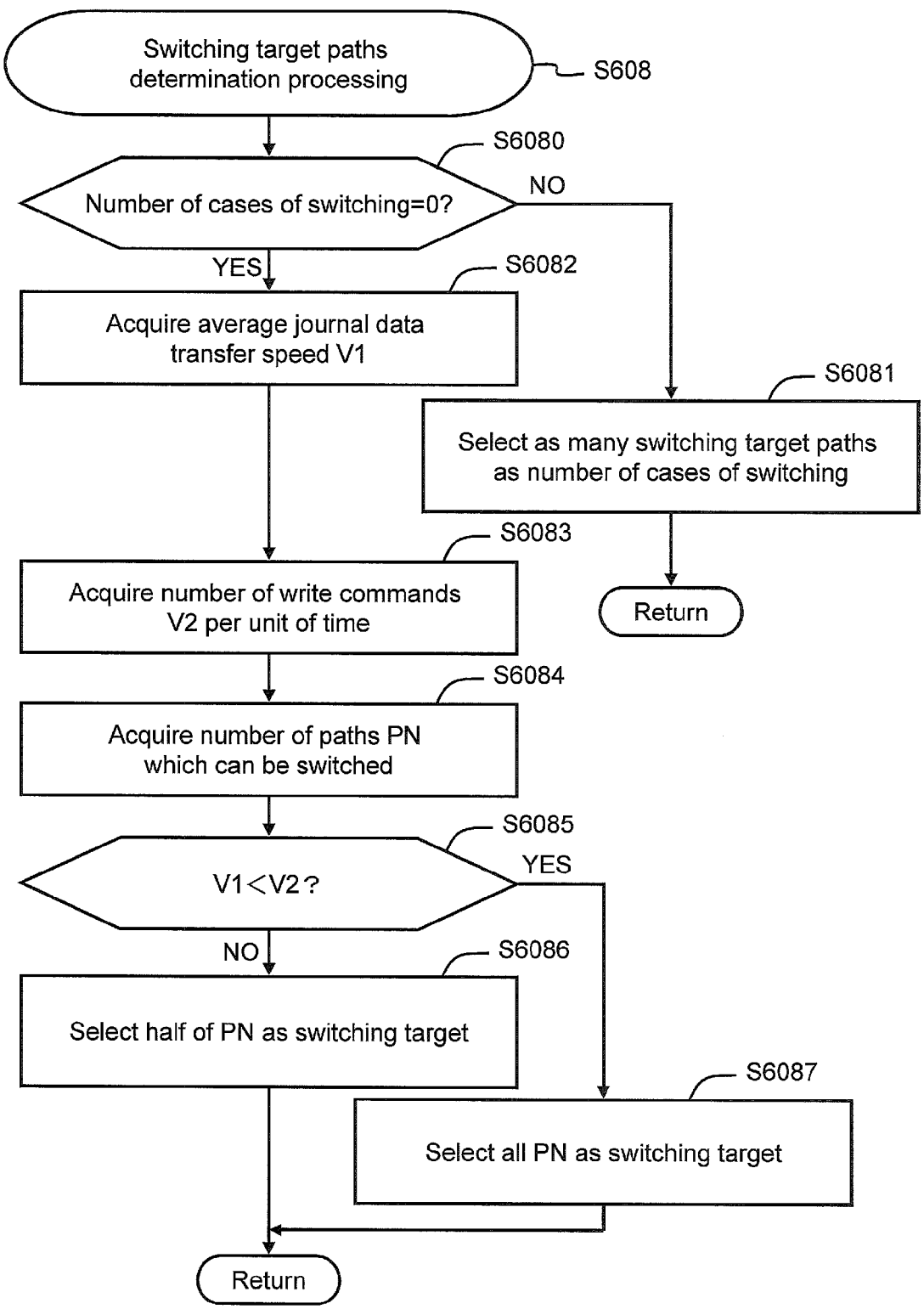
FIG. 23 is a flowchart showing the processing of selecting paths whose communication direction is to be switched.

FIG. 23 is a flowchart showing the processing for determining the switching target paths. This processing shows the details of the step S608 in FIG. 22.

The MCU 100 acquires the number of cases of path switching from the journal group management table T11, and determines whether the number of cases of switching is set to an initial value 0 or not (S6080). If the number of cases of switching is set to another value than the initial value 0 (S6080: NO), the MCU 100 selects as many switching target paths as the number of cases of switching from the first communication paths (S6081). This is because the case where the number of cases of switching is set to another value than the initial value is the case where the user has explicitly set the number of first communication paths whose communication direction is to be switched.

If the number of cases of switching acquired from the journal group management table T11 is set to the initial value 0 (S6080: YES), the MCU 100 acquires an average journal data transfer speed V1 from the monitoring information (S6082).

The MCU 100, for example, monitors the journal data transfer speed, the usage rate of the cache memory 150, the number of received write commands, the number of received read commands, and others. The result of monitoring is stored as monitoring information.

The MCU 100 acquires the number of write commands V2 received per unit of time from the monitoring information (S6083). The MCU 100 acquires the number of first communication paths PN which can be switched from the path management table T12 (S6084). The number of first communication paths PN which can be switched is the number of first communication paths running normally among the first communication paths.

The MCU 100 determines whether the journal data transfer speed V1 is smaller than the number of write commands V2 per unit of time (the speed of writing to the journal volume 170) or not (S6085). The speed V1 at which the journal data is taken from the journal volume 170 and is transferred is a journal data outflow speed from the journal volume 170. The number of write commands per unit of time is a speed at which journal data is written to the journal volume 170, that is, a journal data inflow speed.

If the journal data outflow speed V1 is larger than the journal data inflow speed V2 (S6085: NO), the MCU 100 selects half of the first communication paths (PN/2) which can be switched as the switching target paths (S6086).

If the journal data outflow speed V1 is smaller than the journal data inflow speed V2 (S6085: YES), the MCU 100 selects all the first communication paths that can be switched as the switching target paths (S6087).

In FIG. 23, the switching target first communication paths are selected based only on the magnitude relation between the journal data outflow speed V1 and the journal data inflow speed V2. Instead of the above, it may also be permitted that the switching target first communication paths are selected based on the relationship between the usage rate of the primary journal volume 170 and the journal input/output ratio as shown in the switched path number ascertaining table T13 of FIG. 12.

Figure 24:
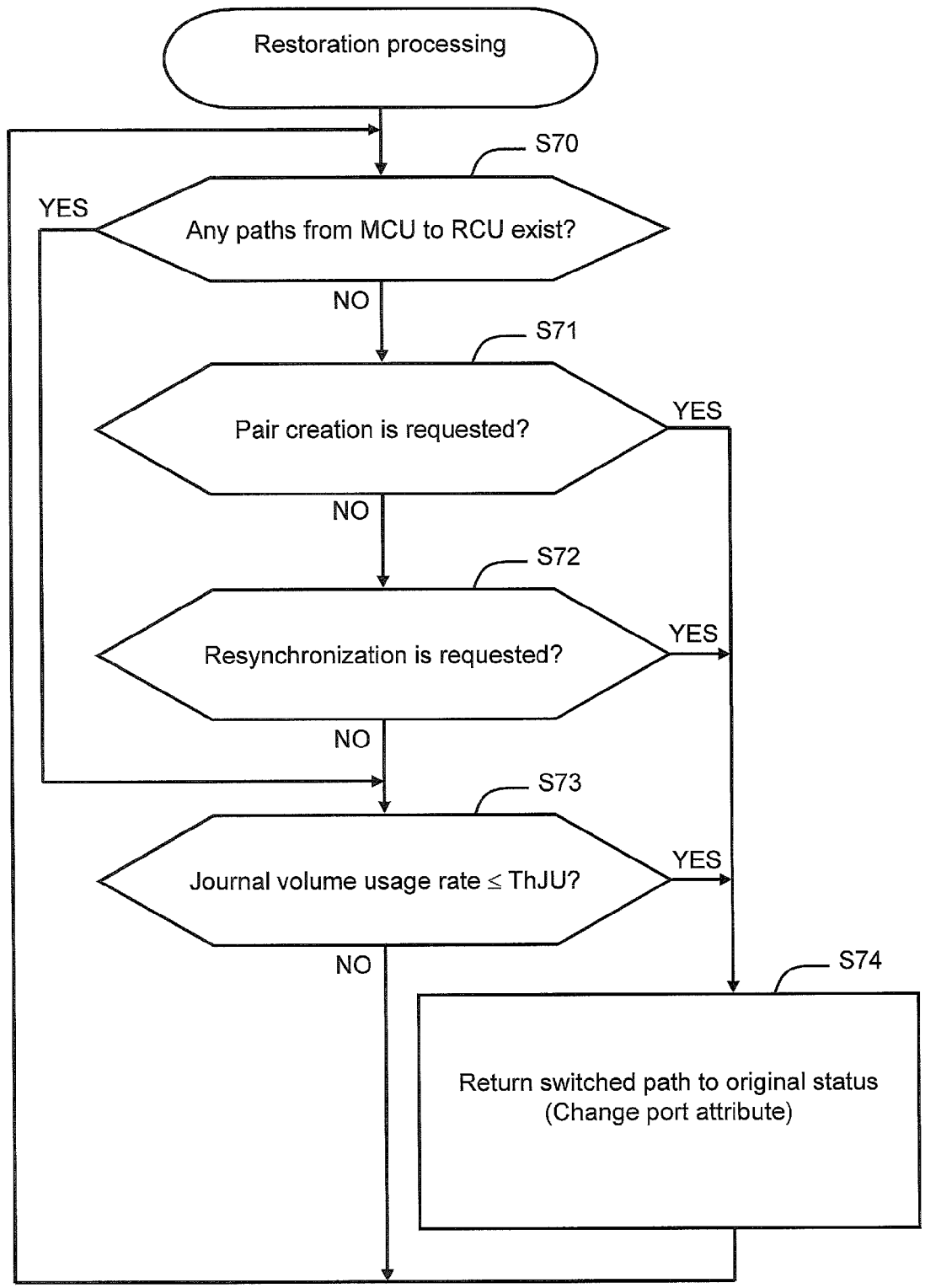
FIG. 24 is a flowchart showing the processing for returning the paths whose communication direction is switched to the original communication direction.

FIG. 24 is a flowchart showing the processing for returning the communication direction of the communication paths to the original communication direction. The MCU 100 restores the communication direction of the first communication paths to the original communication direction if the following specified conditions for restoring are satisfied.

The MCU 100 determines whether a first communication path from the MCU 100 to the RCU 200 exists or not (S70). The MCU 100 determines whether a first communication path in the normal communication direction (specifically speaking, a first communication path whose communication direction is not switched) remains or not.

If the communication direction of all the first communication paths is switched (S70: NO), the MCU 100 determines whether pair creation is requested from the host 30 or not (S71). If pair creation is requested (S71: YES), the MCU 100 switches the communication direction of the first communication paths to the original communication direction (S74). This procedure of re-switching is the same as the switching processing explained in FIG. 22 (S610, S611, and S612). The first communication path is deleted from the management table once, and the attribute of the communication ports of the MCU 100 is changed to an initiator while the attribute of the communication ports of the RCU 200 is changed to a target. Subsequently, the normal first communication paths are set again among the respective communication ports whose attributes are changed to the original attributes.

If no pair creation is requested (S71: NO), the MCU 100 determines whether resynchronization is requested or not (S72). If resynchronization is requested (S72: YES), the MCU 100 returns the communication direction of the first communication paths to the original communication direction (S74).

The MCU 100 determines whether the journal volume usage rate is equal to or smaller than a specified threshold ThJU or not (S73). The MCU 100 may determine whether the usage rate of the primary journal volume 170 is equal to or smaller than a specified threshold ThJU or not, or may also determine whether both the usage rate of the primary journal volume 170 and the usage rate of the secondary journal volume 270 have reached the threshold ThJU or not. Furthermore, a threshold ThJU1 used for determining the usage rate of the primary journal volume 170 and a threshold ThJU2 used for determining the usage rate of the secondary journal volume 270 may also be different.

Specifically speaking, the MCU 100 determines whether it is unnecessary to extend the band of the communication path for the remote storage control apparatus 20 to acquire journal data from the master storage control apparatus 10 since the load of the master storage control apparatus 10 and the load of the remote storage control apparatus 20 are reduced. If the journal volume usage rate is equal to or smaller than the threshold ThJU (S73: YES), the MCU 100 returns the communication direction of the first communication paths to the original communication direction (S74).

At this point, the step of determining whether pair creation is requested or not (S71) and the step of determining whether resynchronization is requested or not (S72) are performed if the communication direction of all the first communication paths is switched to the opposite communication direction from the normal communication direction (S70: NO).

This is because, if any first communication path which is set in the normal communication direction remains, the configuration in which pair creation or resynchronization can be performed by utilizing the normal first communication path may also be performed.

The step for determining the journal volume usage rate (S73) is performed regardless of whether a first communication path in the normal communication direction remains or not.

It should be noted that, if a plurality of first communication paths whose communication direction is already switched exist, all or a part of those first communication paths may be switched to the original communication direction when pair creation is requested, when resynchronization is requested, or when the journal volume usage rate decreases.

In the present embodiment configured as above, the following effects are achieved. In the present embodiment, journal data transfer is controlled in accordance with the status of the communication line and the statuses of the storage control apparatuses 10 and 20. Therefore, journal data can be appropriately transferred in accordance with the change of the actual state, and the occurrence of failures can be prevented in advance.

In the present embodiment, if journal data transfer from the master storage control apparatus 10 to the remote storage control apparatus 20 fails, the direction of the first communication paths for transmitting commands from the master storage control apparatus 10 to the remote storage control apparatus 20 is reversed, and the communication band for transmitting the journal data is extended. Therefore, the possibility of success in journal data transfer can be improved.

In the present embodiment, if journal data transfer fails, the appropriate journal data transfer amount (the transfer speed) is ascertained based on the journal volume usage rate, and the journal data is re-transmitted by the appropriate journal data transfer amount (at the transfer speed). Therefore, the journal data can be transferred in accordance with the loads on the storage control apparatuses 10 and 20, and the possibility of success in journal data transfer can be improved.

The present embodiment pays attention to first communication paths which are used at the time of pair creation, resynchronization, and others and not used in any other occasions, and uses the first communication paths as second communication paths for transferring journal data by utilizing the period in which the first communication paths are not used. Therefore, the communication band for journal data transfer can be extended by effectively utilizing the first communication paths.

It should be noted that the configuration of the present embodiment in which the communication direction of the first communication paths is switched and the first communication paths are used as the second communication paths is entirely different from the configuration in which a spare line is used in addition to a regularly used line. For using the first communication paths as the second communication paths, it is necessary to delete the existing communication paths (switching target first communication paths), change the communication port attributes on the both ends respectively, and set new communication paths (second communication paths). Therefore, compared to the case where the spare line is used, switching the communication direction of the first communication paths takes more effort in the present embodiment.

Therefore, in the present embodiment, when the communication direction of the first communication paths is switched, whether the switching is allowed in advance or not is determined (S601 in FIG. 21), and the communication direction of the first communication paths is switched if no volume pair in use exists (S607 in FIG. 22) or if it is possible to wait until the use of the path by the volume pair terminates (S614 in FIG. 22). By this method, the performance deterioration of the storage system due to the switching cost can be inhibited, and the occurrence of communication failures in journal data transfer can also be inhibited. Therefore, the usability and reliability of the storage system is improved by the present embodiment.

Embodiment 2

The Embodiment 2 is explained with reference to FIG. 25. The following respective embodiments including the present embodiment are relevant to variations of the Embodiment 1. Therefore, hereinafter, the differences from the Embodiment 1 are mainly explained. In the present embodiment, for journal data transfer, the communication direction of a part of a plurality of first communication paths is reversed in advance.

Figure 25:
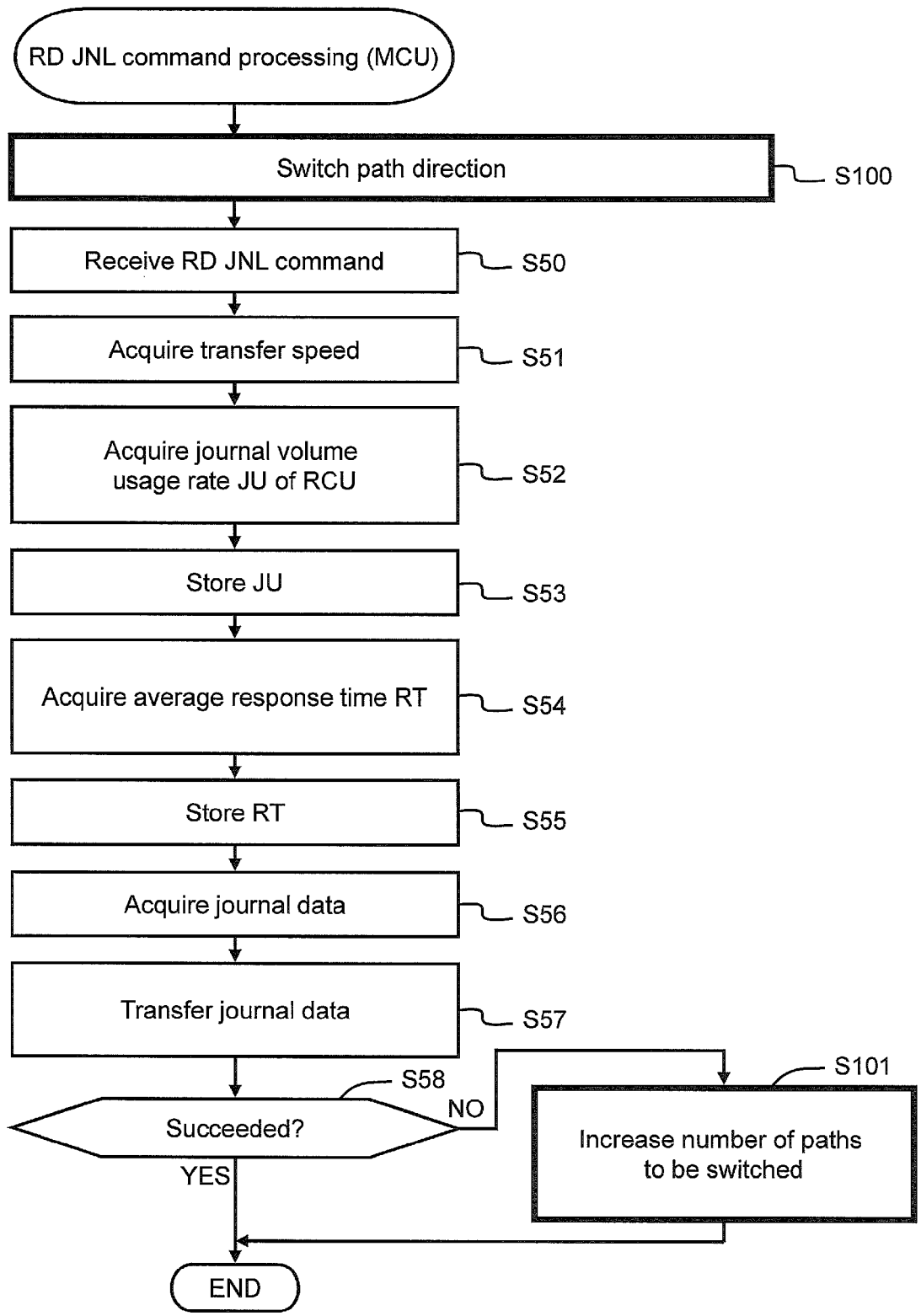
FIG. 25 is a flowchart for processing a journal data read request related to the Embodiment 2.

FIG. 25 is a flowchart for the RD JNL command processing. At the time of the system startup, for example, the MCU 100 reverses the communication direction of at least a part of a plurality of first communication paths (S100).

Receiving an RD JNL command from the RCU 200 (S51), the MCU 100 transfers journal data to the RCU 200 as explained in FIG. 22 (S52 to S57). If journal data transfer succeeds (S58: YES), this processing terminates. If journal data transfer fails (S58: NO), the MCU 100 increases the first communication paths whose communication direction is to be switched (S101).

In the present embodiment, since a specified number of first communication paths is set as second communication paths in advance, the communication band for journal data transfer can be extended before receiving RD JNL commands. Therefore, the journal data can be transferred from the MCU 100 to the RCU 200 more quickly, and the occurrence of communication failures in journal data transfer can also be inhibited.

It should be noted that, the communication direction of the first communication paths is returned to the original communication direction if pair creation is requested, if resynchronization is requested, or if the journal volume usage rate is decreased.

Embodiment 3

The Embodiment 3 is explained with reference to FIG. 26. In the present embodiment, the journal data transfer amount (the transfer speed) is adjusted in advance and, if the above processing does not work enough, the communication direction of the first communication paths is switched. Although a case of adjusting the journal data transfer amount is explained at this point, the present embodiment can also be applied to the case of adjusting the journal data transfer speed.

Figure 26:
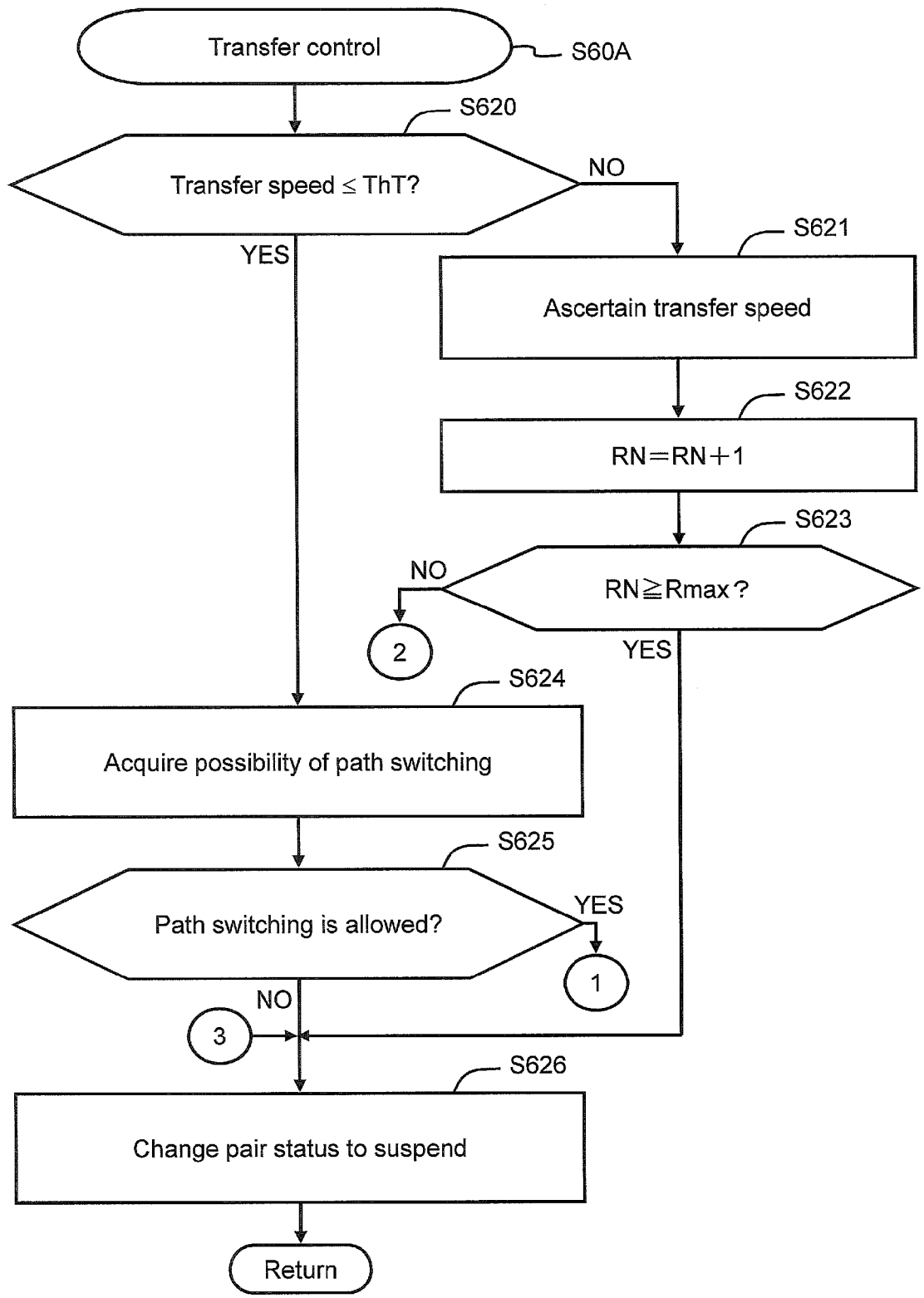
FIG. 26 is a flowchart showing the processing for controlling the transfer amount related to the Embodiment 3.

FIG. 26 is a flowchart showing the transfer control processing 560A. The MCU 100 determines whether the journal data transfer amount has decreased to a specified lower limit value ThT or not (S620). If the journal data transfer amount has not decreased to a specified lower limit value ThT (S620: NO), the MCU 100 ascertains the journal data transfer amount (S621).

The MCU 100 increments the number of retries RN by 1 (S622), and determines whether the number of retries RN has reached an upper limit value RNmax or not (S623). If the number of retries RN has reached the upper limit value RNmax (S623: YES), the MCU 100 changes the pair status of the volume pair to suspend (S626), and returns to the flowchart in FIG. 20.

If the number of retries RN has not reached the upper limit value RNmax (S623: NO), the MCU 100 moves to S56 in FIG. 20, and reads the journal data by the journal data transfer amount ascertained at the step S621 from the journal volume 170.

As explained above, the journal data transfer amount gradually decreases each time journal data transfer fails. If the journal data transfer amount eventually decreases to the lower limit value ThT (S620: YES), the MCU 100 acquires the information indicating whether path switching is possible or not from the journal volume management table T11 (S624). The MCU 100 determines whether switching the first communication path is allowed or not (S625) and, if switching is allowed (S625: YES), moves to the flowchart in FIG. 22. If switching is not allowed (S625: NO), the MCU 100 changes the pair status of the volume pair to suspend (S626).

In the present embodiment configured as above, the journal data transfer amount is adjusted at first, and the communication direction of the first communication paths is switched if the journal data cannot be transferred normally only by decreasing the journal data transfer amount. By this method, the occurrence of communication failures in journal data transfer can also be inhibited while avoiding switching the communication direction of the paths as much as possible.

Embodiment 4

The Embodiment 4 is explained with reference to FIG. 27. In the present embodiment, the transfer control S60 is performed both in case the journal data transfer speed decreases and in case the user requests the performance improvement of the system.

Figure 27:
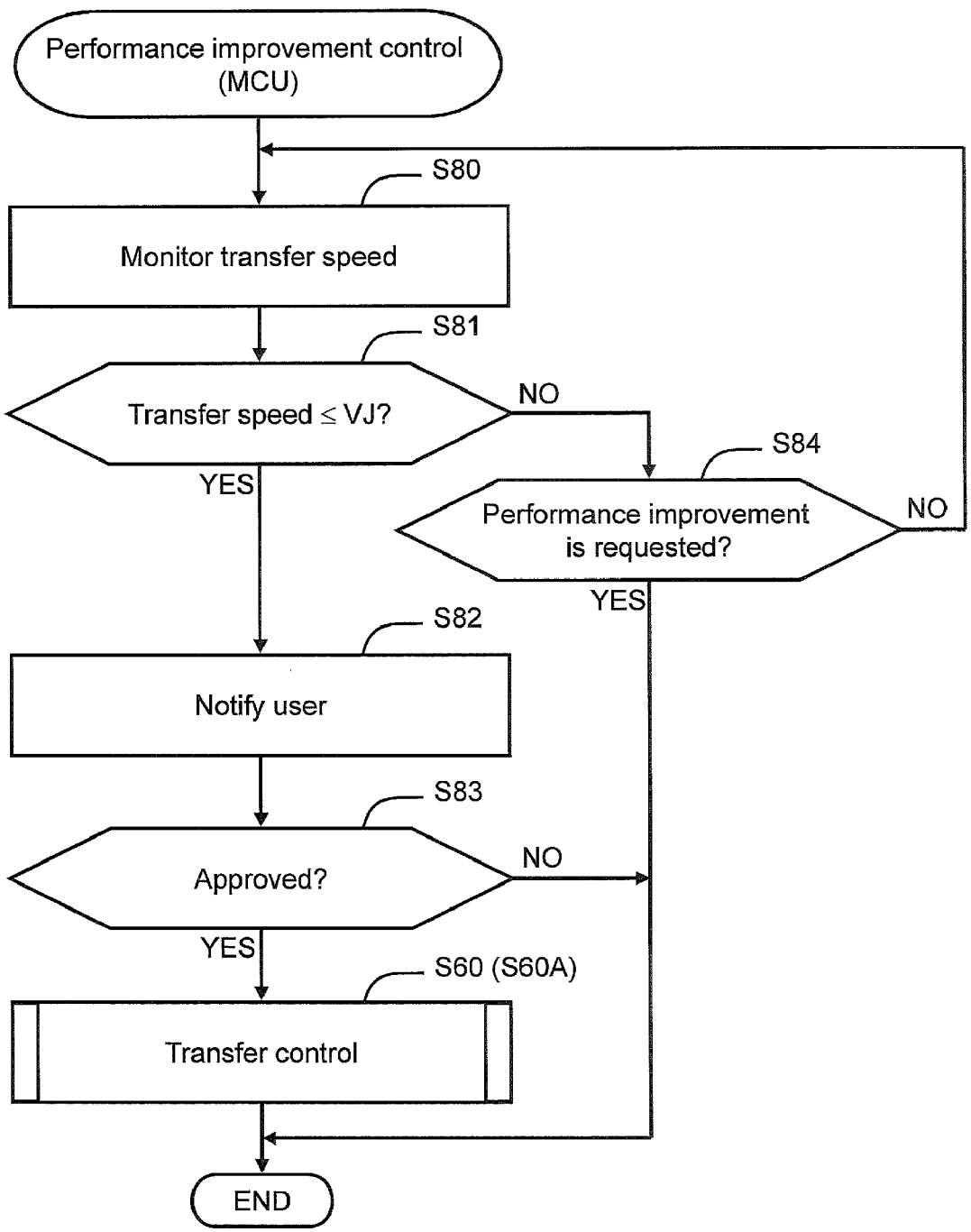
FIG. 27 is a flowchart showing the processing for improving the performance of the storage system related to the Embodiment 4.

FIG. 27 shows the processing for improving the performance of the storage system. The MCU 100 monitors the transfer speed of journal data (S80). The MCU 100 determines whether the journal data transfer speed is equal to or lower than a specified threshold VJ or not (S81).

If the journal data transfer speed is equal to or lower than the threshold VJ (S81: YES), the MCU 100 notifies the user that the journal data transfer speed has decreased (S82). This notification, for example, may be displayed on the screen of a management terminal (not shown in the figure) which manages the storage system and may also be emailed to the user at the email address. The notification states that the journal data transfer speed has decreased and requests approval for performing transfer control for preventing communication failures.

The MCU 100 determines whether the user approved the performance of transfer control or not (S83). If the user's approval is acquired (S83: YES), the MCU 100 performs transfer control which is explained in FIG. 21 or FIG. 26 (S60, S60A).

If the journal data transfer speed has not decreased to the threshold VJ (S81: NO), the MCU 100 determines whether the performance improvement is requested or not (S84). The user can request the MCU 100 to improve the system performance, for example, by way of the management terminal or the host 30. If the performance improvement is requested (S84: YES), the MCU 100 performs transfer control (S60, S60A).

In the present embodiment, transfer control is performed if the journal data transfer speed reaches the threshold VJ or the performance improvement is requested. Therefore, the environment for normally transferring journal data can be prepared before a timeout error and others occur in journal data transfer.

It should be noted that the present invention is not limited to the above-mentioned respective embodiments and may be variously changed without departing from the scope of the invention.

REFERENCE SIGN LIST 1, 10: primary storage control apparatus (master storage control apparatus), 2, 20: secondary storage control apparatus (remote storage control apparatus), 1B, 160: primary volume, 1D, 170: primary journal volume, 2E, 260: secondary volume, 2C, 270: secondary journal volume.

The invention claimed is:

1. A storage system in which a primary storage control apparatus and a secondary control apparatus are connected by way of a communication network,
wherein the primary storage control apparatus and the secondary storage control apparatus are connected by way of at least one first communication path for transmitting a command from the primary storage control apparatus to the secondary storage control apparatus and at least one second communication path for transmitting a command from the secondary storage control apparatus to the primary storage control apparatus,
the primary storage control apparatus comprises:
a command processing unit for writing write data received from a host computer to a primary volume;
a journal data creation unit for creating journal data based on the write data and storing the journal data in a primary journal volume corresponding to the primary volume;
a journal data transfer unit for reading journal data from the primary journal volume based on a journal data read request received by way of the second communication path and transferring the read journal data to the second storage control apparatus; and
a transfer control unit, which, in specified occasions, controls at least either one of the journal data transfer amount by the journal data transfer unit and the width of the communication band utilized for journal data transfer, and
the secondary storage control apparatus comprises:
a journal data acquisition unit for issuing the journal data read request, acquiring the journal data from the journal data transfer unit, and
storing the acquired the journal data in a secondary journal volume; and
a journal processing unit for reading the journal data from the secondary journal volume and writing the journal data to a secondary volume corresponding to the primary volume; and
a transfer status determination unit for determining whether the journal data transfer by the journal data transfer unit succeeded or not, and if it is determined by the transfer status determination unit that the journal data transfer failed, the transfer control unit controls at least either one of the journal data transfer amount by the journal data transfer unit and the width of the communication band;
wherein the transfer control unit is configured to:
control at least either one of the journal data transfer amount by the journal data transfer unit and the width of the communication band either if performance improvement is requested or if the journal data transfer speed decreases to equal to or lower than a specified speed;
ascertain the journal data transfer amount by the journal data transfer unit based on the usage rate of the primary journal volume and the usage rate of the secondary journal volume;
control the journal data transfer amount by the journal data transfer unit by performing transfer amount adjustment processing for reducing the journal data transfer amount for each second communication path;
wherein if it is determined that the journal data transfer failed, the transfer control unit is further configured to:
reduce the journal data transfer amount for each second communication path; and
perform communication path switching processing for switching the direction of communication paths, thereby extending the communication band where the journal data can be transferred by setting the communication direction of specified first communication paths among the first communication paths in an opposite direction and using the specified first communication paths as the second communication paths.

2. A storage system according to claim 1, wherein if it is determined that the journal data transfer failed, the transfer control unit firstly performs the communication path switching processing, and if it is determined that the journal data transfer failed even after performing the communication path switching processing, performs the transfer amount adjustment processing.

3. A storage system according to claim 2, wherein the transfer control unit comprises switching instruction information for changing the attribute of a first communication port corresponding to the specified first communication paths from an initiator to a target, and instructing in the response to the journal data read request that the communication direction of the specified first communication paths be switched in the opposite direction if the communication path switching processing is to be performed, and
the secondary storage control apparatus changes the attribute of a second communication port corresponding to the specified first communication paths from the target to the initiator based on the switching instruction information.

4. A storage system according to claim 3, wherein either if a pair creation is requested or if the changing of a pair status to resynchronization is requested, the transfer control unit performs return processing for returning the communication direction of the specified first communication paths, the communication direction of which has been switched, to the original direction.

5. A storage system according to claim 4, wherein in a case where all of the first communication paths are selected as the specified first communication paths and the communication direction has been switched, the transfer control unit performs the return processing either if the pair creation is requested or if the changing of the pair status to resynchronization is requested.

6. A storage system according to claim 5, wherein the transfer control unit also performs the return processing if the usage rate of the primary journal volume and the usage rate of the secondary journal volume have both decreased to equal to or lower than a specified usage rate.

7. A storage system according to claim 1, wherein the transfer control unit performs communication path switching processing for switching the direction of a communication path prior to receiving the journal data read request, and
in the communication path switching processing, extends the communication band where the journal data can be transferred by setting the communication direction of specified first communication paths of the first communication paths in the opposite direction and using the specified first communication paths as the second communication paths.

8. A volume pair synchronization method for synchronizing a primary volume of a primary storage control apparatus and a secondary volume of a secondary storage control apparatus using journal data, wherein the primary storage control apparatus and the secondary storage control apparatus are connected by way of at least one first communication path for transmitting a command from the primary storage control apparatus to the secondary storage control apparatus, and at least one second communication path for transmitting a command from the secondary storage control apparatus to the primary storage control apparatus, the primary storage control apparatus:
writing write data received from a host computer to the primary volume; creates journal data based on the write data;
storing the journal data in a primary journal volume corresponding to the primary volume;
receiving a journal data read request by way of the second communication path;
reading journal data from the primary journal volume based on the journal data read request;
transferring the read the journal data to the second storage control apparatus;
switching the communication direction of the first communication path and sets the number of first communication paths to be used as the second communication paths based on the ratio between the speed at which the journal data is stored in the primary journal volume and the speed at which the journal data is read from the primary journal volume; and
controlling the journal data transfer amount based on the usage rate of the primary journal volume and the usage rate of the secondary journal volume of the secondary storage control apparatus, and the secondary storage control apparatus:
issuing the journal data read request;
acquiring journal data from the primary storage control apparatus;
storing the acquired the journal data in the secondary journal volume; and
reading the journal data from the secondary journal volume and writes the journal data to the secondary volume, which comprises a volume pair with the primary volume.

* * * * *